(12) United States Patent
Seo et al.

(10) Patent No.: US 11,581,842 B2
(45) Date of Patent: Feb. 14, 2023

(54) MAGNET TEMPERATURE ESTIMATING DEVICE FOR MOTOR AND HYBRID VEHICLE PROVIDED WITH THE SAME

(71) Applicant: Mazda Motor Corporation, Hiroshima (JP)

(72) Inventors: Nobuhide Seo, Aki-gun (JP); Genri Suzuki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 161 days.

(21) Appl. No.: 17/131,064

(22) Filed: Dec. 22, 2020

(65) Prior Publication Data
US 2021/0234495 A1 Jul. 29, 2021

(30) Foreign Application Priority Data
Jan. 28, 2020 (JP) ............................. JP2020-012002

(51) Int. Cl.
*H02P 29/66* (2016.01)
*B60K 6/24* (2007.10)
*B60K 6/26* (2007.10)

(52) U.S. Cl.
CPC .............. *H02P 29/662* (2016.11); *B60K 6/24* (2013.01); *B60K 6/26* (2013.01); *B60Y 2200/92* (2013.01); *B60Y 2400/3086* (2013.01)

(58) Field of Classification Search
CPC ......... H02P 29/662; H02P 29/67; B60K 6/24; B60K 6/26; B60Y 2200/92; B60Y 2400/3086; G01K 2217/00; G01K 7/36; G01K 7/42
See application file for complete search history.

(56) References Cited

U.S. PATENT DOCUMENTS

| 2014/0062362 | A1* | 3/2014 | Kawai | ...................... H02P 3/22 318/400.22 |
| 2014/0232306 | A1* | 8/2014 | Yasui | ........................ H02P 6/00 318/400.02 |
| 2015/0303860 | A1* | 10/2015 | Imanishi | ................ H02K 21/14 318/473 |
| 2015/0372624 | A1* | 12/2015 | Urushihara | ............. B60L 50/11 318/400.22 |
| 2017/0070113 | A1* | 3/2017 | Oh | ....................... H02K 1/2786 |

FOREIGN PATENT DOCUMENTS

| JP | 2006304462 A | * 11/2006 |
| JP | 2007336708 A | 12/2007 |
| WO | 2014167690 A1 | 10/2014 |

* cited by examiner

*Primary Examiner* — Bickey Dhakal
(74) *Attorney, Agent, or Firm* — Alleman Hall Creasman & Tuttle LLP

(57) ABSTRACT

A magnet temperature estimating device for a motor including a rotor having magnets and configured to output a rotational motive force, and a stator having a plurality of coils opposing the rotor with a gap therebetween, is provided. The device includes a sensor configured to detect an induced voltage induced by rotation of the rotor, and a controller configured to control the motor by supplying power to the plurality of coils in response to an input of a detection signal from the sensor. Gaps adjacent to each magnet in a rotation direction of the rotor are formed in the rotor. The controller estimates a temperature of the magnet based on the induced voltage detected when the magnet opposes any one of the plurality of coils, according to the rotation of the rotor.

18 Claims, 12 Drawing Sheets

MAGNET TEMPERATURE ESTIMATING DEVICE FOR MOTOR AND HYBRID VEHICLE PROVIDED WITH THE SAME

TECHNICAL FIELD

The technology disclosed herein relates to a magnet temperature estimating device for a motor, and a hybrid vehicle provided with the same.

BACKGROUND OF THE DISCLOSURE

JP2007-336708A discloses, as one example of the magnet temperature estimating devices for motors, a temperature estimating device for permanent magnets of a permanent-magnet type rotary machine (motor). In detail, the device disclosed in JP2007-336708A extracts a magnetic flux density of the permanent magnets and estimates a temperature of the permanent magnets based on the extracted magnetic flux density.

Moreover, WO2014/167690A1 discloses, as another example of the magnet temperature estimating devices for motors, a cooling control device for a motor of an electric vehicle. In detail, the device disclosed in WO2014/167690A1 detects an induced voltage which is caused when driving the motor, and estimates a magnet temperature of the motor based on the detected induced voltage.

Meanwhile, when magnets which constitute a rotor of the motor become excessively high in temperature, they become irreversibly demagnetized. Therefore, in order to maintain the performance of the motor, it is necessary to reduce the magnet temperature when the magnets become high in temperature. In order to reduce the magnet temperature more securely, it is required for estimating the magnet temperature with sufficient accuracy.

Here, as a method of estimating the magnet temperature, it is possible to use the induced voltage which is caused by driving the motor, as disclosed in WO2014/167690A1. However, the induced voltage varies during the operation of the motor because the magnetic flux varies in connection with the rotation of the rotor. This is inconvenient for estimating the magnet temperature with sufficient accuracy.

SUMMARY OF THE DISCLOSURE

Therefore, the technology disclosed herein is made in view of the above situations, and one purpose thereof is to suppress a variation in an induced voltage, thereby improving an estimation accuracy of a magnet temperature.

The present disclosure relates to a magnet temperature estimating device for a motor provided with a rotor having magnets and configured to output a rotational motive force, and a stator having a plurality of coils opposing the rotor with a gap therebetween.

According to a first aspect of the present disclosure, the magnet temperature estimating device for the motor includes a sensor configured to detect an induced voltage induced by rotation of the rotor, and a controller configured to control the motor by supplying power to the plurality of coils in response to an input of a detection signal from the sensor. Apertures adjacent to each magnet in a rotation direction of the rotor are formed in the rotor. The controller estimates a temperature of the magnet based on the induced voltage detected when the magnet opposes any one of the plurality of coils, according to the rotation of the rotor.

Here, the "induced voltage" means the induced electromotive force caused by magnetic flux which is generated from the magnet.

In general, as clear from the Faraday's law of induction, the magnitude of the induced voltage is proportional to a temporal change in the magnetic flux which crosses the coil. Therefore, when the temporal change in the magnetic flux is relatively large, the induced voltage also changes relatively largely. In other words, detecting the induced voltage at a timing where the temporal change in the magnetic flux is reduced as much as possible, can suppress the variation in the induced voltage.

As a result of the present inventors' diligent analyses, according to the knowledge acquired, a timing where one of the magnets opposes the coil upon the rotation of the rotor, is just such a timing where the temporal change in the magnetic flux is reduced. Therefore, the magnet temperature estimating device for the motor estimates the magnet temperature based on the induced voltage detected when the magnet opposes the coil. With this configuration, the temporal variation in the induced voltage can be reduced as much as possible.

Moreover, the temporal change in the induced voltage at the timing described above is further reduced by providing the apertures in the rotor. This phenomenon occurs by the apertures functioning as the flux barriers, which reduces a leakage of the magnetic flux from end parts of the magnet which opposes the coil to stabilize a change in the amount of magnetic flux in the end parts, and suppresses a turning around of the magnetic flux from other magnets adjacent to the magnet which opposes the coil.

In this manner, the combination of using the induced voltage detected at the timing where the magnet opposes the coil and functioning the apertures as the flux barriers can suppress the temporal change as much as possible when detecting the induced voltage. Therefore, the magnet temperature can be estimated with sufficient accuracy.

Meanwhile, as a method of obtaining the magnet temperature based on the induced voltage, an effective value, an average value, and a maximum value of the induced voltage may be used, or the lowest order higher harmonic wave when the induced voltage is divided into a frequency component may be used. However, when these methods are used, although the temperature of the entire magnet can be estimated, they are not suitable for individually estimating the temperature of each magnet.

On the other hand, according to this configuration, it is possible to detect the induced voltage for every magnet to individually estimate the magnet temperature. Thus, this configuration is effective in that it can individually estimate the temperature of each magnet with sufficient accuracy.

According to a second aspect of the present disclosure, the controller may store in advance a timing at which a center part of the one magnet in the rotation direction crosses a center axis line of each of the plurality of coils as the rotor rotates, and acquire the induced voltage at the stored timing.

According to this configuration, the controller stores in advance, as the timing where the magnet opposes the coil upon the rotation of the rotor, the timing at which the center part of the magnet in the rotation direction crosses the center axis line of each coil. By setting in advance the timing to detect the induced voltage in this way, the induced voltage can be detected more securely, and, as a result, it is advantageous in estimating the magnet temperature with sufficient accuracy.

According to a third aspect of the present disclosure, the controller may acquire the induced voltages over a given period including the stored timing, and estimate the temperature of the one magnet based on an average value of the induced voltages acquired over the given period.

According to this configuration, the controller estimates the magnet temperature based on the average value of the induced voltages acquired over the given period. By using the average value instead of the induced voltage detected at a specific timing, the effect of the variation in the induced voltage resulting from noise, etc. can be reduced. This becomes advantageous when estimating the magnet temperature with sufficient accuracy.

According to a fourth aspect of the present disclosure, in a cross section perpendicular to a rotation axis of the rotor, when a dimension of each aperture in the rotation direction is $D_1$ and a diameter of the coil in the rotation direction is $D_2$, a relationship of $$D_1 \geq D_2/4 \text{ may be satisfied.}$$

According to this configuration, by making the dimension of the aperture in the rotation direction longer, the effect of the flux barrier can be improved. As a result of the present inventors' diligent analyses, according to the data obtained, the flux-barrier function can be demonstrated sufficiently when Formula (A) described above is satisfied. This can reduce the temporal variation in the induced voltage more securely, and, as a result, this configuration is effective in estimating the magnet temperature with sufficient accuracy.

According to a fifth aspect of the present disclosure, for each aperture, the aperture may extend in the rotation direction, and a dimension of the aperture in a radial direction of the rotor may decrease along the rotation direction away from the adjacent magnet in the rotation direction.

According to this configuration, since a part of the aperture close to the magnet is secured widely in the cross-sectional area because the dimension in the radial direction is relatively larger, it is advantageous in demonstrating the flux-barrier function. On the other hand, since a part of the aperture away from the magnet is shortened gradually in the radial dimension to be tapered, it is advantageous in securing the mechanical strength of the rotor.

Therefore, with this configuration, while improving the function of the flux barrier, the mechanical strength can be secured.

According to a sixth aspect of the present disclosure, each aperture may communicate with an accommodation space configured to accommodate the adjacent magnet, the accommodation space being formed in the rotor. The accommodation space may have a pair of support surfaces pinching the adjacent magnet from both sides in the radial direction. At least one of the pair of support surfaces may be connected flush with an inner circumferential surface of the aperture.

According to this configuration, by connecting the support surface flush with the inner circumferential surfaces of the apertures, it is possible to connect both surfaces smoothly. With this configuration, it is possible to vary the induced voltage smoothly, as compared with the configuration in which a stepped part exists between the support surface and the inner circumferential surfaces of the apertures. Therefore, the temporal change in the induced voltage is suppressed more securely, and, as a result, it is advantageous in estimating the magnet temperature with sufficient accuracy.

According to a seventh aspect of the present disclosure, the sensor may be comprised of a search coil superimposed on one of the plurality of coils, the search coil being connected to a circuit independent of an inverter configured to drive the motor. The controller may estimate the temperature of the one magnet based on the induced voltage induced in the search coil.

According to this configuration, by using the search coil, it is possible to indirectly detect the induced voltage caused in the coil on which the search coil is superimposed. In this case, the magnet temperature estimating device for the motor detects the temperature of the magnet opposing the coil on which the search coil is superimposed upon the rotation of the rotor. Thus, the magnet temperature can be estimated individually.

According to an eighth aspect of the present disclosure, the controller may determine a temperature state of the one magnet based on the estimation result of the temperature of the one magnet. The controller may regulate the output of the motor when the controller determines that the temperature state is abnormal.

According to this configuration, by estimating the magnet temperature with sufficient accuracy as described above, the temperature state of the magnet can be determined accurately. Thus, the timing at which the output of the motor should be regulated can be determined accurately, and, as a result, the motor can be controlled more suitably.

Further, according to a ninth aspect of the present disclosure, a hybrid vehicle is provided, which includes the motor magnet temperature estimating device described above and the motor, and an engine configured to collaborate with the motor.

According to this configuration, by estimating the magnet temperature with sufficient accuracy, the increase in the magnet temperature can be suppressed at a more suitable timing, which can support the performance of the motor for a long period. As a result, it contributes to the long life of the hybrid vehicle.

DETAILED DESCRIPTION OF THE DISCLOSURE

Hereinafter, one embodiment of the present disclosure is described with reference to the accompanying drawings. Note that the following description is illustration.

(1) Movable Body
(1-1) Overall Configuration

Figure 1:
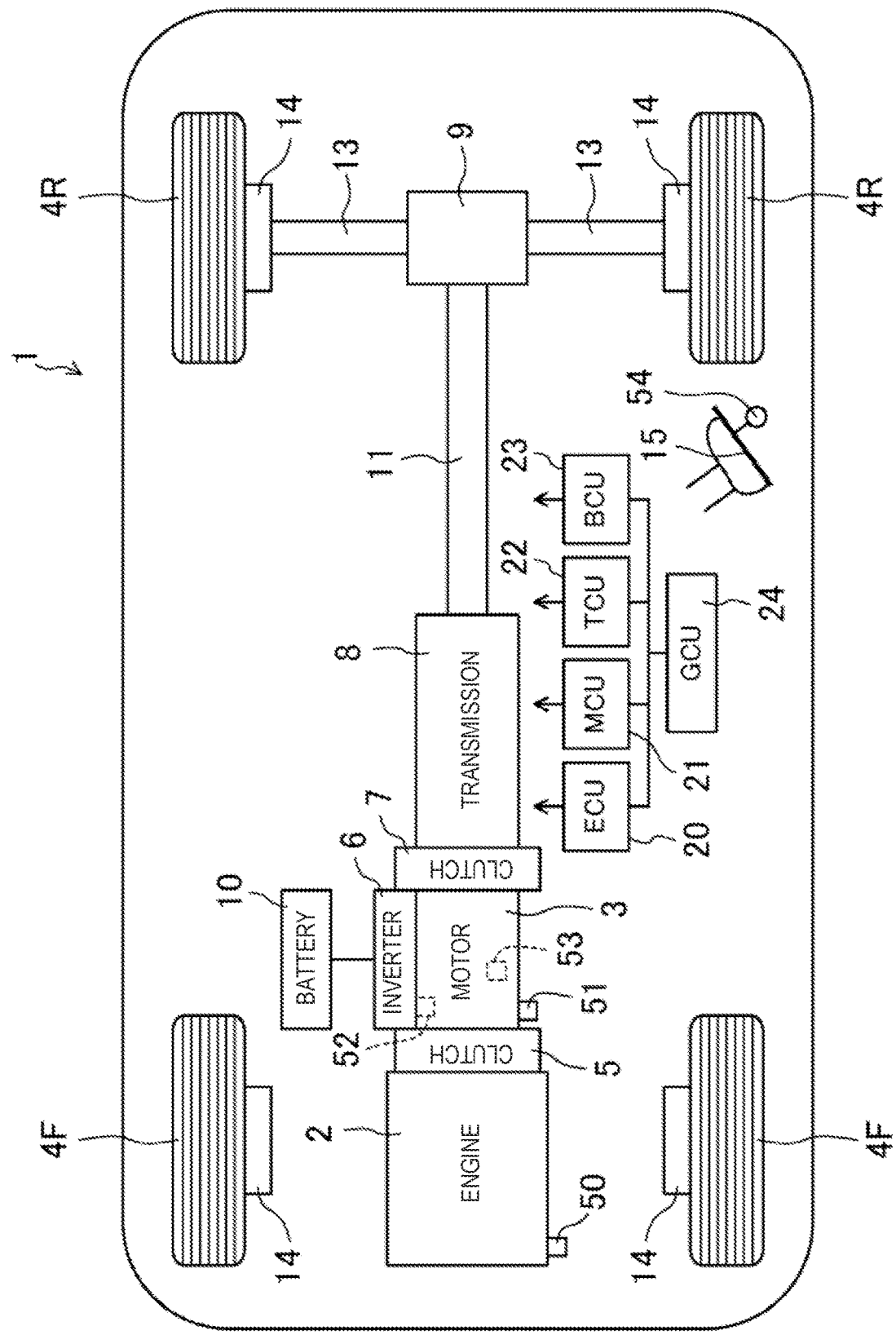
FIG. 1 is a schematic view illustrating a configuration of an automobile.

FIG. 1 is a schematic view illustrating a configuration of an automobile 1 as a movable body. The automobile 1 illustrated in FIG. 1 is a four-wheel hybrid vehicle. The automobile 1 as a hybrid vehicle includes a motor 3 and an engine 2 which collaboratively operates with the motor 3, as drive sources. The engine 2 and the motor 3 collaboratively operate to rotate driving wheels 4R located on the rear side of a vehicle body among four wheels 4F and 4R. The automobile 1 moves (travels) by this rotation.

In this automobile 1, the engine 2 is disposed on the front side of the vehicle body, and the driving wheels 4R are disposed on the rear side of the vehicle body, as described above. That is, the automobile 1 is a so-called "front engine, rear-wheel drive (FR) vehicle." Moreover, in this automobile 1, the engine 2 mainly generates motive power, rather than the motor 3. The motor 3 is used for assisting the drive of the engine 2. That is, the automobile 1 is a so-called "mild hybrid vehicle." Moreover, the motor 3 not only functions as the drive source, but also functions as a power generator for regeneration.

Note that the automobile 1 is not limited to the mild hybrid vehicle. The automobile 1 may be a so-called "full hybrid vehicle" in which the motor 3 mainly generates the motive power.

The automobile 1 includes, in addition to the engine 2 and the motor 3, a first clutch 5, an inverter 6, a second clutch 7, a transmission 8, a differential gear 9, and a battery 10, as drive-system devices. The automobile 1 travels by the operation of the complex of these devices (drive system).

The automobile 1 also includes, as control-system devices, an engine control unit (ECU) 20, a motor control unit (MCU) 21, a transmission control unit (TCU) 22, a brake control (BCU) 23, and a general control unit (GCU) 24.

The control-system devices are electrically connected to various sensors. As will be described later, the automobile 1 includes a motor rotation sensor 51, a search coil 55, and a voltage sensor 56, particularly as sensors relevant to the motor 3.

(1-2) Drive-System Devices

The engine 2 is, for example, an internal combustion engine which combusts gasoline as fuel. The engine 2 is a so-called "four-cycle engine." That is, the engine 2 according to this embodiment generates a rotational motive force by repeating a cycle consisting of an intake stroke, a compression stroke, an expansion stroke, and an exhaust stroke. Note that the type of the engine 2 is not limited to what is illustrated in this embodiment. The engine 2 may be any other various types, such as a diesel engine.

The engine 2 is provided with an output shaft (not illustrated) which outputs the rotational motive force. This output shaft extends in a front-and-rear direction of the vehicle body, and is disposed in a substantially center part in a vehicle width direction. The automobile 1 is provided with various systems associated with the engine 2, such as an intake system, an exhaust system, and a fuel supply system. Illustration and description of these systems are omitted.

Figure 2A:
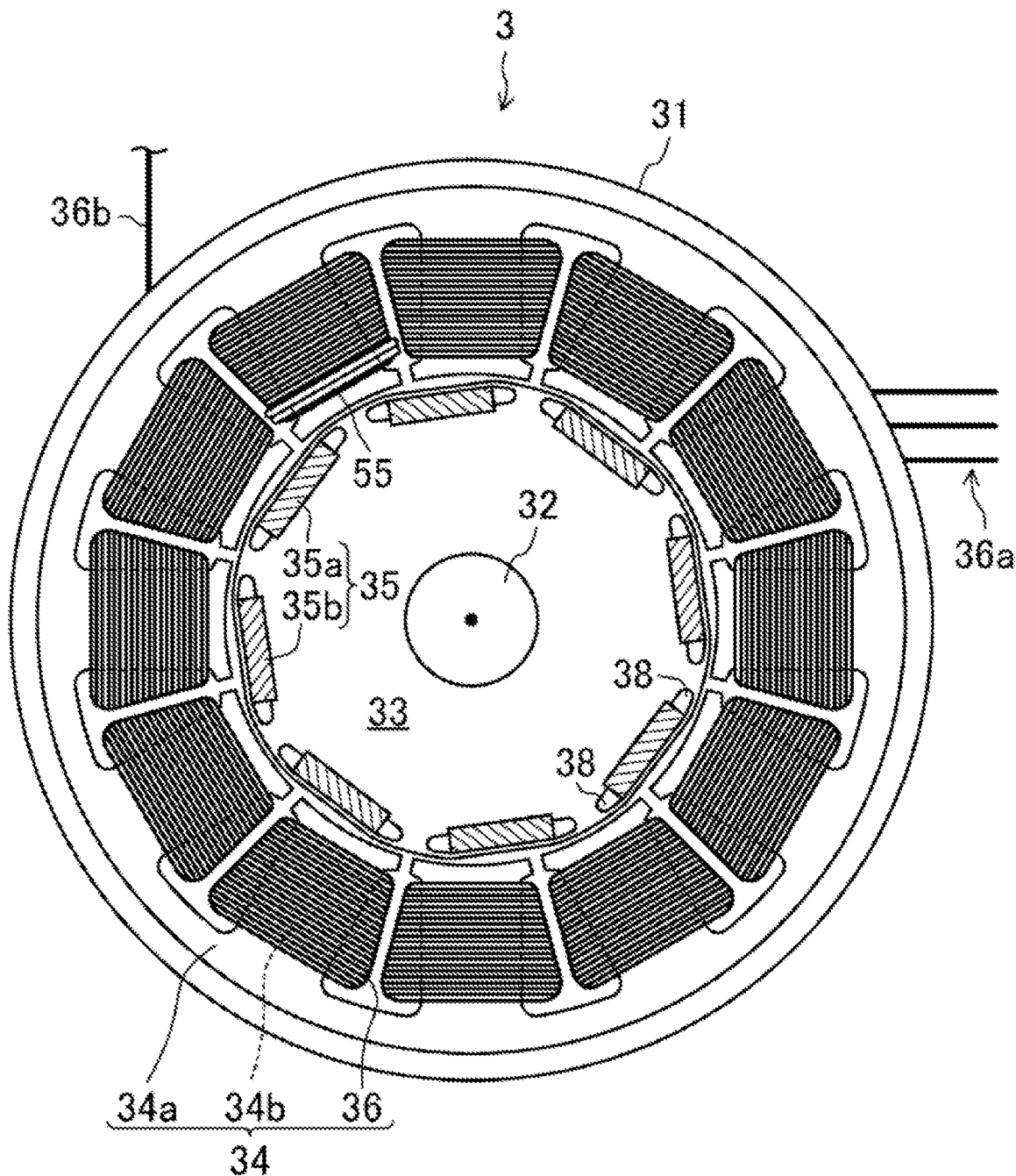
FIG. 2A is a cross-sectional view schematically illustrating a configuration of a motor.
Figure 2B:
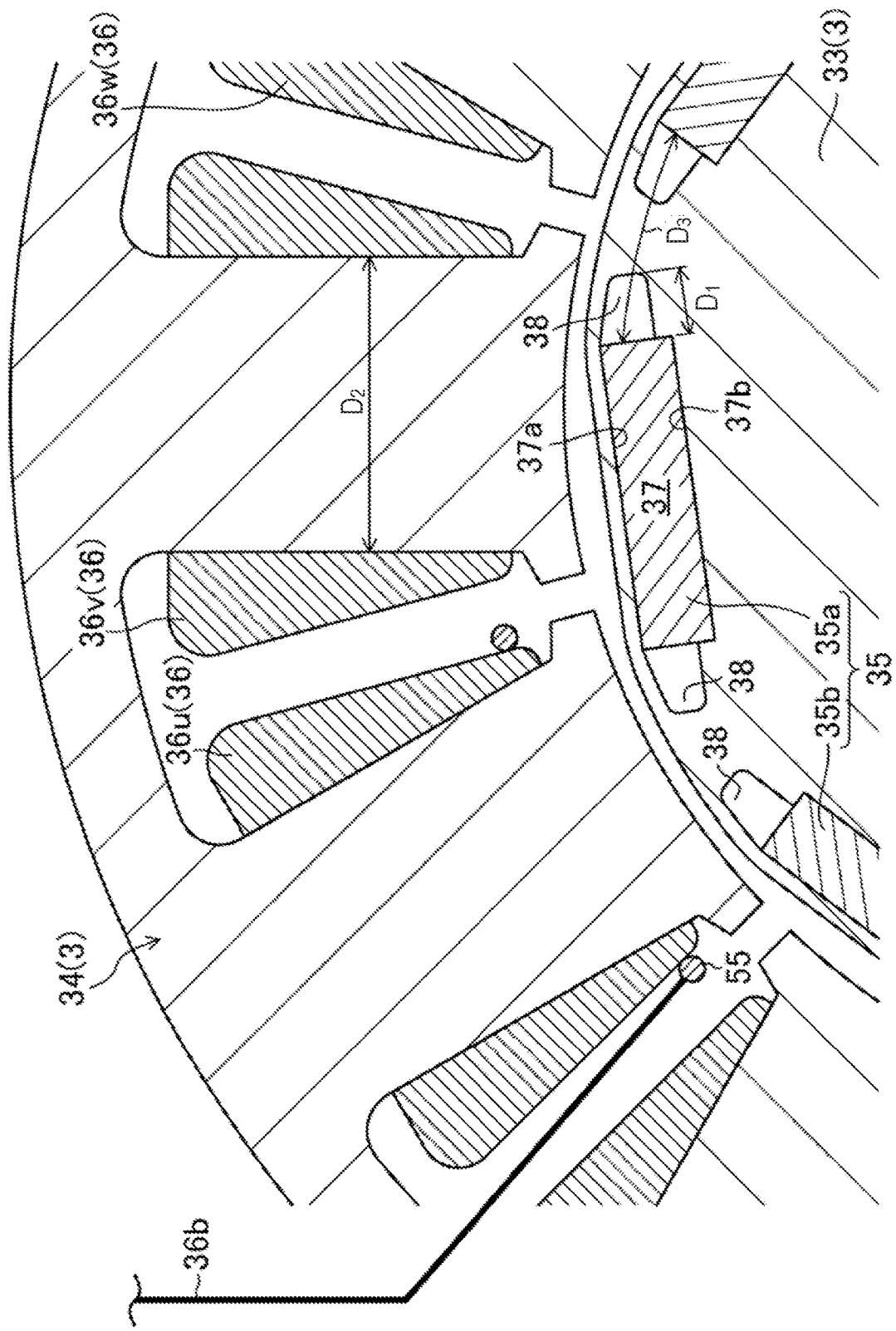
FIG. 2B is a cross-sectional view schematically illustrating the configuration of the motor.

FIGS. 2A and 2B are cross-sectional views schematically illustrating a configuration of the motor 3. As illustrated in FIG. 1, the motor 3 illustrated in FIGS. 2A and 2B is disposed behind the engine 2. This motor 3 is serially coupled to the engine 2 through the first clutch 5. The motor 3 is a permanent-magnet type synchronous motor which is driven by three-phase alternating current. As illustrated in FIG. 2A, the motor 3 roughly includes a motor case 31, a shaft 32, a rotor 33, and a stator 34.

The motor case 31 is comprised of a cylindrical container which defines a cylindrical space. The motor case 31 is fixed to the vehicle body of the automobile 1 in a state where both end faces in the axial direction are sealed. The rotor 33 and the stator 34 are accommodated in the motor case 31. The shaft 32 is rotatably supported by the motor case 31 in a state where both end parts in the axial direction project from the motor case 31.

The first clutch 5 is installed between one end part (a front end part) of the shaft 32 and the output shaft of the engine 2. The first clutch 5 is switchable between a state where the output shaft and the shaft 32 are coupled to each other (a coupled state) and a state where the output shaft and the shaft 32 are decoupled from each other (a decoupled state).

The second clutch 7 is installed between the other end part (a rear end part) of the shaft 32 and an input shaft of the transmission 8. The second clutch 7 is switchable between a state where the shaft 32 and the input shaft are coupled to each other (a coupled state) and a state where the shaft 32 and the input shaft are decoupled from each other (a decoupled state).

Note that the first clutch 5 and the second clutch 7 are adjustable of the motive power transmitted through the shaft 32 in a state between the coupled state and the decoupled state (a partially-coupled state).

The rotor 33 has magnets 35 and outputs the rotational motive force. In detail, the rotor 33 according to this embodiment is comprised of a cylindrical member. This cylindrical member is formed by laminating a plurality of metal plates each having an axial hole at the center, along the axial direction. The rotor 33 is integrated with the shaft 32 by fixing an intermediate part of the shaft 32 to the axial holes of the rotor 33.

A plurality of magnets 35 are disposed on the outer circumferential part of the rotor 33 along the rotation direction of the rotor 33. The plurality of magnets 35 include first magnets 35a of which the S-poles are oriented toward the inner circumferential surface of the stator 34, and second magnets 35b adjacent to the first magnets 35a in the rotation direction, of which the N-poles are oriented toward the inner circumferential surface of the stator 34.

Note that "the rotation direction of the rotor 33" is equivalent to the circumferential direction of the rotor 33 (i.e., the circumferential direction of the stator 34 and the motor 3). In the following description, the term "the rotation direction of the rotor 33" as used herein is simply referred to as "the rotation direction." Similarly, the term "the radial direction of the rotor 33" as used herein is simply referred to as "the radial direction" in the following description.

Moreover, in the following description, in order to clarify the posture of the first magnet 35a with respect to the stator 34, the first magnet 35a may also be referred to as an "S-magnet 35a." Similarly, the second magnet 35b may also be referred to as an "N-magnet 35b."

The plurality of magnets 35 are comprised of, for example in the configuration illustrated in FIG. 2A, four first magnets 35a and four second magnets 35b. The first magnets 35a and the second magnets 35b are alternately disposed in the rotation direction, with equal interval therebetween.

Moreover, the plurality of magnets 35 are each formed in a rectangular shape with the dimension in the rotation direction longer than the dimension in the radial direction in the cross sections illustrated in FIGS. 2A and 2B (i.e., a cross section perpendicular to the shaft 32).

Moreover, the plurality of magnets 35 are each comprised of a so-called "variable magnetic-force magnet." That is, the plurality of magnets 35 are each variable in the magnetic force. Normally, as for the motor 3 of this type, permanent magnets with large coercivity are used in order to maintain the magnetic force over a long period of time. As for this motor 3, permanent magnets with coercivity smaller than normal permanent magnets are used as the magnets 35 so that the magnetic force is comparatively easily changeable.

There are various types of permanent magnets used as the magnets 35, which include ferrite magnets, neodymium magnets, samarium cobalt magnets, and Alnico magnets, with different coercivity. The material of the magnet 35 is selectable according to the usage, and therefore, it is not limited in particular.

Moreover, the magnets 35 are accommodated in respective accommodation spaces 37 defined along the periphery of the rotor 33. As illustrated in FIG. 2B, each accommodation space 37 is defined by a pair of support surfaces 37a and 37b for supporting the magnet 35. The pair of support surfaces 37a and 37b pinch the magnet 35 from both sides in the radial direction.

The stator 34 has a plurality of coils 36 disposed so as to oppose the rotor 33 with a gap therebetween. In detail, the stator 34 according to this embodiment has a stator core 34a which is formed by laminating a plurality of metal plates, and the plurality of coils 36 which are each formed by winding an electric wire around the stator core 34a.

Among these, the stator core 34a is provided with a plurality of teeth 34b extending radially. The electric wire is wound around slots, each defined between adjacent teeth 34b, in a given order. Then, the plurality of coils 36 are each formed by the electric wire coiled in this way. That is, the plurality of coils 36 are each constructed as a so-called "concentrated winding coil."

The plurality of coils 36 constitutes three phase coil groups with different phases of current (U-phase, V-phase, W-phase) which flow therethrough. Each coil group is disposed in the order in the rotation direction. For example, in the configuration illustrated in FIG. 2A, the plurality of coils 36 are comprised of the total of twelve coils 36. The twelve coils 36 is classified into a U-phase coil group comprised of four coils 36, a V-phase coil group comprised of four coils 36, and a W-phase coil group comprised of four coils 36.

Below, the coils 36 belonging to the U-phase coil group may be referred to as "U-phase coils 36u," the coils 36 belonging to the V-phase coil group may be referred to as "V-phase coils 36v," and the coils 36 belonging to the W-phase coil group may be referred to as "W-phase coils 36w" (see FIG. 2B, etc.)

Note that in this embodiment, although the eight-pole twelve-slot motor 3 is illustrated, the configuration of the motor 3 is not limited to this example. The motor 3 may have a larger number of poles and a larger number of slots. For example, the motor 3 may be comprised of 2×N magnets 35 and 3×N slots (here, N is an integer).

In order to supply power to the coils 36, three connecting cables 36a are connected to these coils 36. The three connecting cables 36a are comprised of a connecting cable 36a connected to the U-phase coil group, a connecting cable 36a connected to the V-phase coil group, and the connecting cable 36a connected to the W-phase coil group. These connecting cables 36a are drawn outside the motor case 31 and connected with the battery 10 through the inverter 6. In this automobile 1, as for the battery 10, a battery with the rated voltage below 50V, and, in detail, a 48V DC battery (low voltage battery), is used.

The battery 10 according to this embodiment is not a high-voltage battery like those mounted on the conventional hybrid vehicle. Therefore, the battery 10 can be reduced in weight and size. Moreover, since the advanced electric-shock countermeasures are not necessary, insulating members, etc. can also be simplified. By this simplification, the battery 10 can further be reduced in the weight and size. Thus, since the weight of the automobile 1 can be reduced, fuel efficiency and power efficiency can be improved.

The battery 10 supplies direct current to the inverter 6. The inverter 6 converts the direct current into alternating current of three phases comprised of U-phase, V-phase, and W-phase. The inverter 6 supplies the alternating current converted into the U-phase to the U-phase coil group, supplies the alternating current converted into the V-phase to the V-phase coil group, and supplies the alternating current converted into the W-phase to the W-phase coil group.

By the supply of the alternating current, the coils 36 which constitute the coil groups generate a magnetic field. Then, the coils 36 which generated the magnetic field attract or repulse the magnets 35 to rotate the rotor 33. The rotated rotor 33 outputs the rotational motive force through the shaft 32. This rotational motive force is inputted into the transmission 8 through the shaft 32 and the second clutch 7.

In this automobile 1, the transmission 8 is a multiple-stage automatic transmission (a so-called "AT"). The transmission 8 has an input shaft at one end and has an output shaft at the other end. A transmission mechanism, including a plurality of planetary gear mechanisms, clutches, and brakes, are incorporated between the input shaft and the output shaft. By switching such a transmission mechanism, forward and reverse of the automobile 1 can be switched, and rotational speeds of the input shaft and the output shaft of the transmission 8 can be changed. The output shaft of the transmission 8 extends in the front-and-rear direction of the vehicle body. The output shaft is coupled to the differential gear 9 through a propeller shaft 11 disposed coaxially with the output shaft.

The differential gear 9 is coupled to a pair of drive shafts 13. The pair of drive shafts 13 extend in the vehicle width direction, and are coupled to the left and right driving wheels 4R. The rotational motive force outputted through the propeller shaft 11 is distributed to each drive shaft 13 by the differential gear 9, and the distributed forces are then transmitted to the driving wheels 4R through the corresponding drive shafts 13. A brake 14 for braking the rotation is attached to each of the wheels 4F and 4R.

Moreover, the motor 3 according to this embodiment is provided with two kinds of sensors 55 and 56 in order to determine a temperature of the magnets 35 which constitute the rotor 33 (hereinafter, simply referred to as "the magnet temperature"). The two kinds of sensors 55 and 56 are comprised of the search coil 55 and the voltage sensor 56 (see FIG. 3). These sensors 55 and 56 are both capable of detecting the induced voltage caused by the rotation of the rotor 33.

Among these, the search coil 55 is formed by superimposing an electric wire on any one of the plurality of coils 36, as illustrated in FIG. 2B. The search coil 55 is coaxial with the coil 36 on which the electric wire is superimposed. The search coil 55 is connected to the MCU 21 through a search connecting cable 36b. The search connecting cable 36b is electrically separated from the three connecting cables 36a which lead to the inverter 6. That is, the search connecting cable 36b is connected to a circuit which is independent from the inverter 6 for driving the motor 3.

The search coil 55 detects the induced voltage which is induced by the magnets 35 passing through the coil 36 where the search coil 55 is formed, when rotating the rotor 33, and then inputs the detection signal into the MCU 21.

On the other hand, although the detailed illustration is omitted, the voltage sensor 56 detects a voltage between a neutral point of the motor 3 and each of the connecting cables 36a and then inputs the detection signals into the MCU 21.

Here, the motor 3 illustrated in FIG. 1, etc. is provided with a feature part which is suitable for detecting the induced voltage by the search coil 55 and the voltage sensor 56. In detail, apertures 38 adjacent to each magnet 35 in the rotation direction are formed in the rotor 33 according to this embodiment. The apertures 38 are disposed adjacent to both ends of the magnet 35 in the rotation direction.

Each aperture 38 functions as a so-called "flux barrier." That is, the aperture 38 suppresses the magnetic flux of a certain magnet 35 from turning around other magnets 35 inside the rotor 33. Therefore, the magnetic flux which crosses the stator 33 through the aperture can be increased.

In detail, each aperture 38 extends in the rotation direction so as to separate from the corresponding magnet 35. The dimension of each aperture 38 in the rotation direction is defined based on the dimension of the coil 36. In detail, when the dimension of the aperture 38 in the rotation direction is $D_1$ and the diameter of the coil 36 in the rotation direction is $D_2$ in a cross section perpendicular to the rotation axis (the shaft 32) of the rotor 33 (i.e., in the cross section illustrated in FIG. 2B), the following relationship is satisfied.

$$D_1 \geq D_2/4 \quad (A)$$

Formula (A) defines a lower limit of the dimension of the aperture 38 in the rotation direction. Moreover, when a spacing between the adjacent magnets 35 in the rotation direction is $D_3$ in the cross section illustrated in FIG. 2B, the following relationship is satisfied.

$$D_3 \geq 2 \times D_1 \quad (B)$$

Formula (B) defines an upper limit of the dimension of the aperture 38 in the rotation direction.

Based on Formulas (A) and (B), the following relationship is satisfied.

$$D_2/4 \leq D_1 \leq D_3/2 \quad (C)$$

Moreover, the dimension of the aperture 38 in the radial direction decreases along the rotation direction away from the magnet 35. That is, the aperture 38 is tapered as illustrated in FIG. 2B. As illustrated in this drawing, tip-end parts of the adjacent apertures 38 face each other in the rotation direction.

Moreover, the apertures 38 communicate with the accommodation space 37 of the corresponding magnet 35 in the rotor 33. As illustrated in FIG. 2B, the radially-outward support surface 37a among the support surfaces 37a and 37b which define the accommodation space 37 is connected flush with the inner circumferential surfaces of the apertures 38. On the other hand, the radially-inward support surface 37b is connected with the inner circumferential surfaces of the apertures 38 through a stepped part.

(1-3) Control-System Device

The automobile 1 includes, in order to control its traveling, the ECU 20, the MCU 21, the TCU 22, the BCU 23, and the GCU 24, which are described above. Among these, the ECU 20 is a unit that mainly controls operation of the engine 2. The MCU 21 is a unit that mainly controls operation of the motor 3. The TCU 22 is a unit that mainly controls operation of the first clutch 5, the second clutch 7, and the transmission 8. The BCU 23 is a unit that mainly controls operation of the brake 14. The GCU 24 is electrically connected to the ECU 20, the MCU 21, the TCU 22, and the BCU 23, and is a host unit which comprehensively controls these units.

Figure 3:
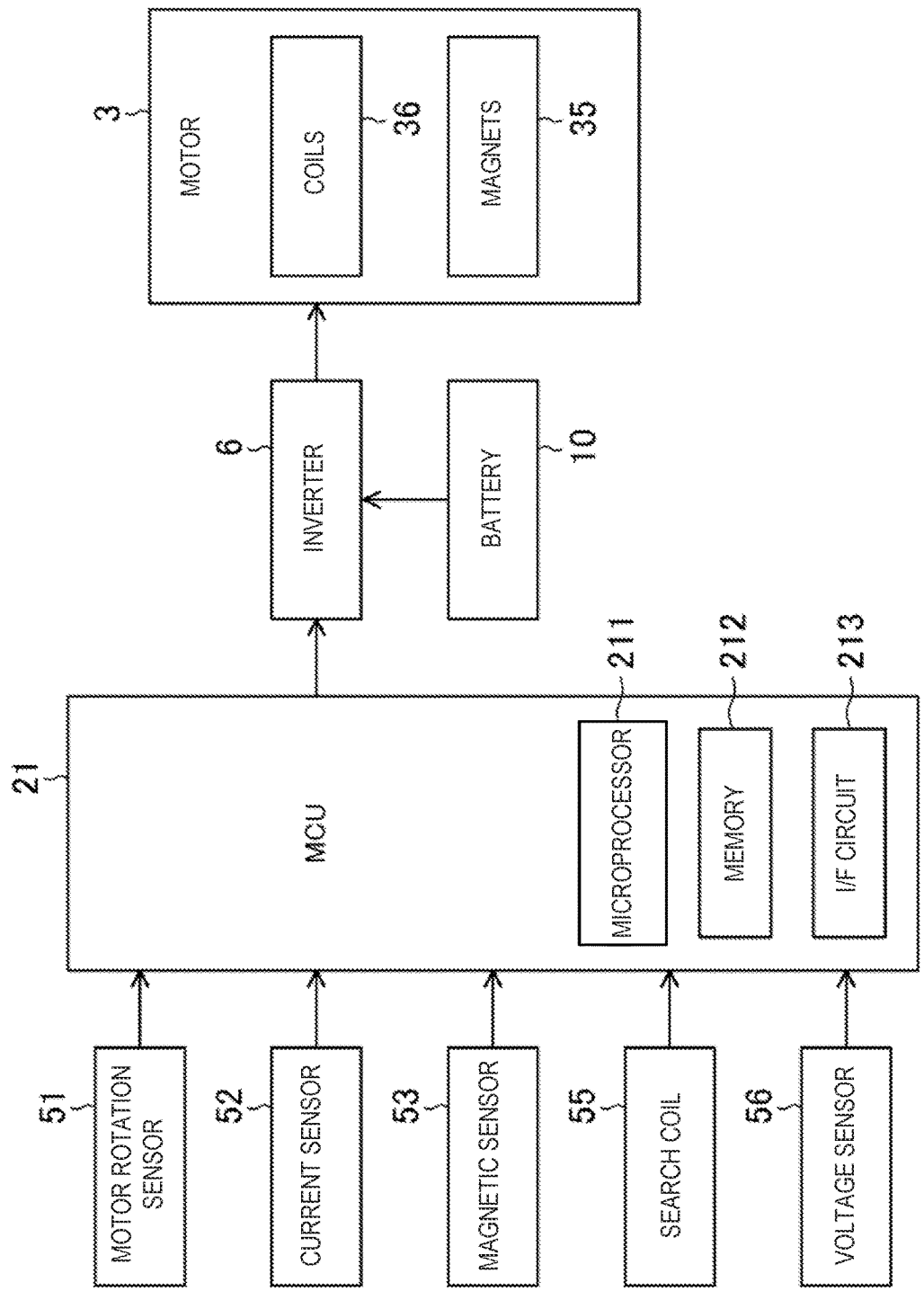
FIG. 3 is a block diagram illustrating a motor control unit (MCU) and an I/O device relevant to the MCU.

The MCU 21 among these units constitutes a "motor control device." The MCU 21 is one example of a controller. As illustrated in FIG. 3, the MCU 21 includes a microprocessor 211, memory 212, and an interface (I/F) circuit 213. The microprocessor 211 executes a program. The memory 212 stores the program and data. The memory 212 is, for example, RAM (Random Access Memory) and ROM (Read Only Memory). The I/F circuit 213 outputs and inputs an electrical signal.

Moreover, each unit other than the MCU 21 (e.g., the GCU 24) constitutes "the motor control device" by collaborating with the MCU 21. Each unit is provided with a microprocessor (not illustrated), memory (not illustrated), and an I/F circuit (not illustrated), similar to the MCU 21.

The MCU 21 is connected to the search coil 55 and the voltage sensor 56 as sensors. Detection signals of the search coil 55 and the voltage sensor 56 are inputted into the MCU 21. Sensors other than the search coil 55 and the voltage sensor 56, which are relevant to the traveling of the automobile 1, may be the following sensors 50-54.

First, the engine speed sensor 50 detects an engine speed of the engine 2 and inputs it into the ECU 20. The engine speed sensor 50 is attached to the engine 2. The motor rotation sensor 51 detects a rotational speed and a rotational position of the rotor 33 and inputs them into the MCU 21. The motor rotation sensor 51 is attached to the motor 3. The current sensor 52 detects a value of current supplied to each coil 36 and inputs them into the MCU 21. The current sensor 52 is attached to the connecting cable 36a.

The magnetic sensor 53 detects a magnetic field caused by the magnet 35 and inputs a signal indicative of the strength into the MCU 21. The magnetic sensor 53 is attached to the motor 3. The accelerator sensor 54 detects an accelerator opening corresponding to an output required for propelling the automobile 1 and inputs a signal indicative of the magnitude into the ECU 20. The accelerator sensor 54 is attached to an accelerator pedal 15 which is stepped on when a vehicle operator drives the automobile 1.

The automobile 1 travels by the units collaboratively controlling the drive system based on the detection signals inputted from these sensors. When the automobile 1 travels by the drive of the engine 2, the ECU 20 controls the operation of the engine 2 based on the detection signals from the accelerator sensor 54 and the engine speed sensor 50.

The TCU 22 controls the first clutch 5 and the second clutch 7 so that they become in the coupled state. When braking the automobile 1, the BCU 23 controls each brake 14. When braking with regeneration, the TCU 22 controls the first clutch 5 so that it becomes in the decoupled state or the partially-coupled state, and controls the second clutch 7 so that it becomes in the coupled state. Thus, the MCU 21 controls so that the motor 3 generates electric power and the regenerated electric power is collected by the battery 10.

On the other hand, the MCU 21 controls the motor 3 by supplying power to the plurality of coils 36. In detail, the MCU 21 controls so that the automobile 1 travels by the rotational motive force of the motor 3 in a state where the motor 3 solely outputs the rotational motive force, or in a state where the motor 3 assists the drive of the engine 2.

In detail, the ECU 20 sets the rotational motive force of the engine 2 based on the detected values of the accelerator sensor 54 and the engine speed sensor 50. Then, the GCU 24 sets a demanded amount of the rotational motive force of the motor 3 so that it falls within a given output range, according to a given distribution ratio of the outputs of the engine 2 and the motor 3. The MCU 21 controls the motor 3 by the three-phase alternating current which flows into the motor 3 so that the demanded amount is outputted.

In more detail, the MCU 21 controls a torque current component in the three-phase alternating current to change torque generated in the rotor 33. Therefore, the motor 3 outputs the demanded amount of the rotational motive force.

The MCU 21 also controls a magnetizing current component in the three-phase alternating current to change the magnetic field strength generated in the coil 36. Although the details are omitted, the magnetic field strength generated by the magnets 35 (the magnetic force of the magnets 35) can be changed by changing the magnetic field strength generated in the coil 36. In detail, the magnetic force of the magnet 35 is changed so as to be substantially in agreement with the magnetic field strength generated in the coil 36 by the driving current.

Moreover, the MCU 21 can perform an estimation of the magnet temperature and a motor control based on the magnet temperature, according to given control logic. Below, the control logic for estimating the magnet temperature is described in detail.

(2) Estimation Logic of Magnet Temperature

Figure 4:
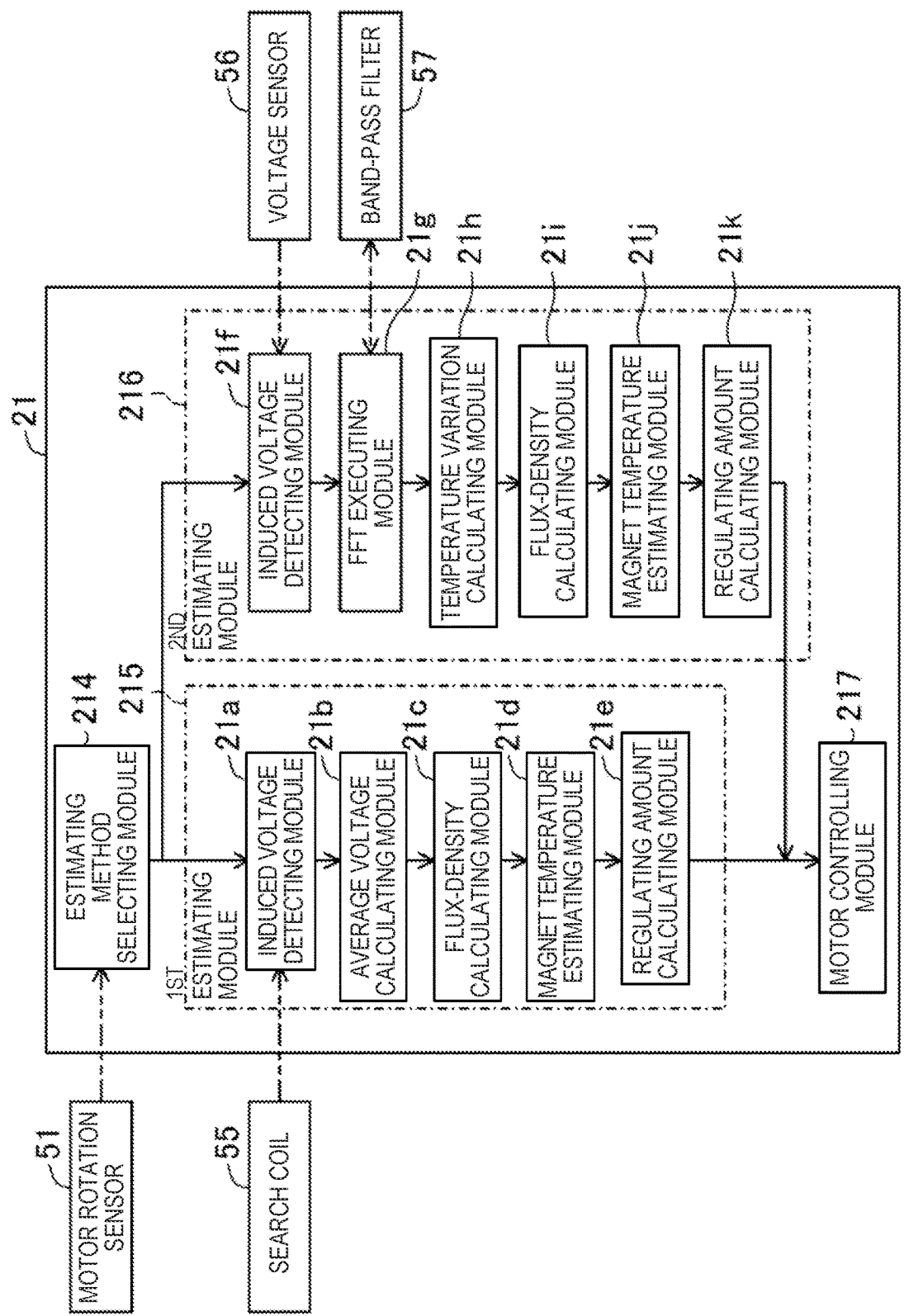
FIG. 4 is a block diagram illustrating a configuration of a motor magnet temperature estimating device.

As the control logic for determining the magnet temperature, the MCU 21 can execute two kinds of estimation logic solely or in combination. That is, the MCU 21 constitutes a "motor magnet temperature estimating device." The configuration of the MCU 21 as the motor magnet temperature estimating device is as illustrated in FIG. 4.

A first estimation logic among the two kinds of estimation logic is control logic focusing on a timing at which the induced voltage becomes flat. Moreover, a second estimation logic is control logic focusing on a harmonic content of the induced voltage. The two kinds of estimation logic are stored in the memory 212.

(2-1) First Estimation Logic

Figure 5:
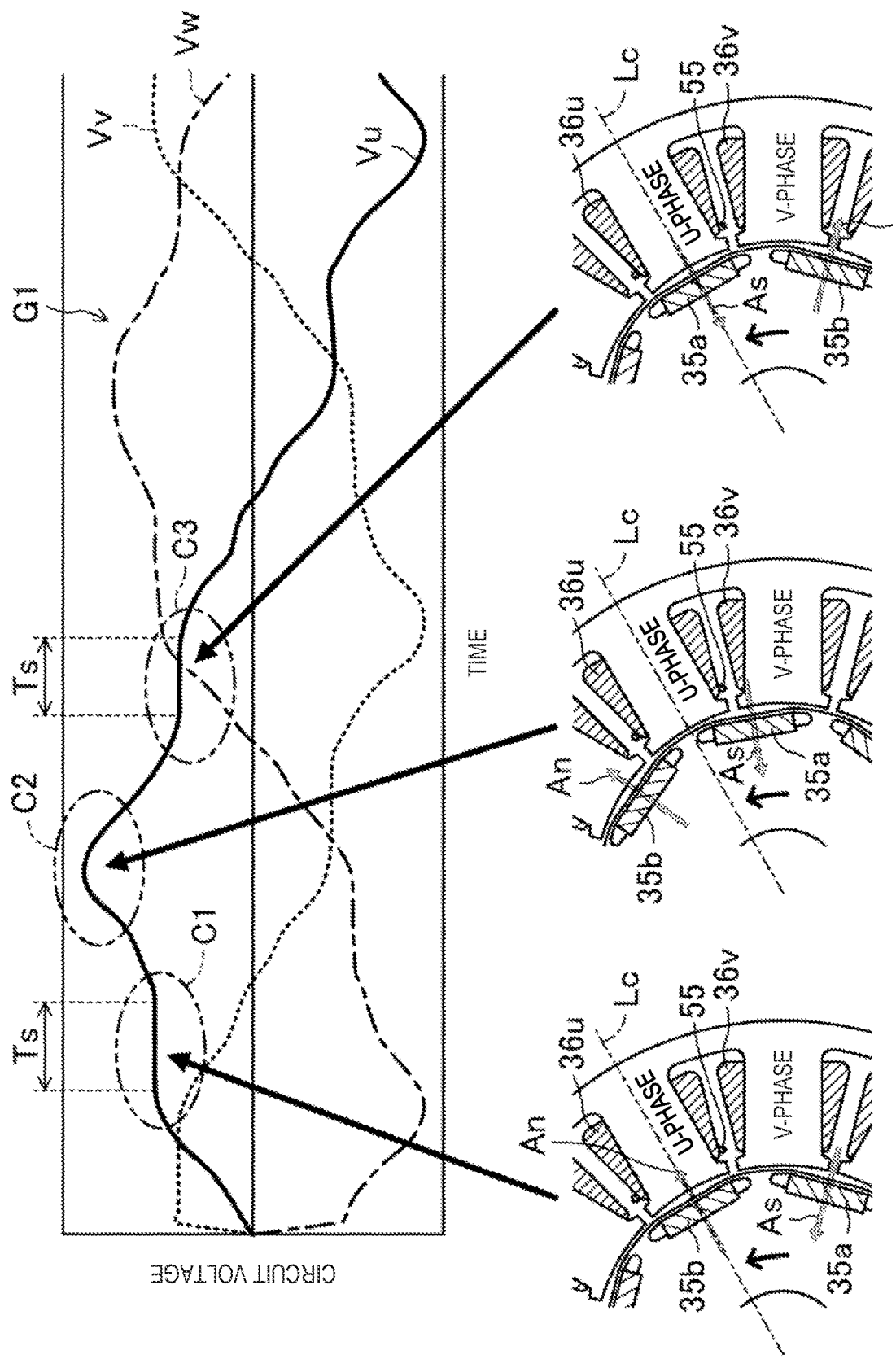
FIG. 5 is a graph illustrating an induced voltage caused in a coil.
Figure 6:
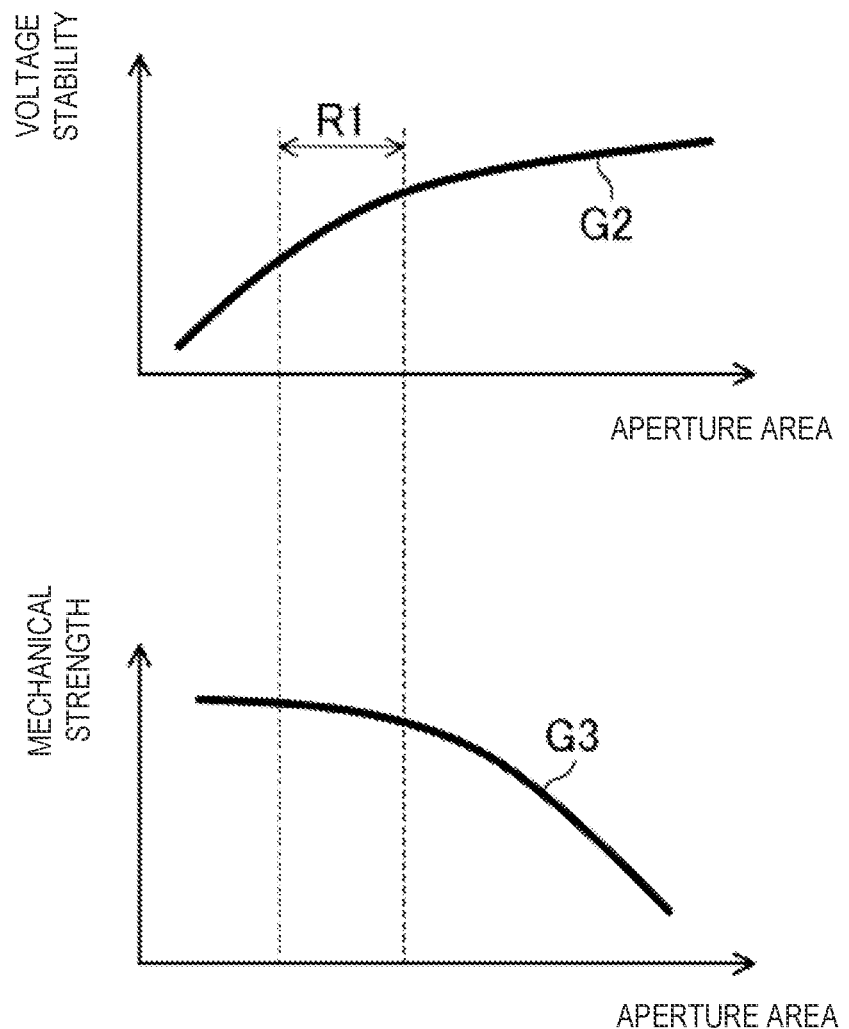
FIG. 6 is a graph illustrating relationships between an aperture area, and voltage stability and mechanical strength.

FIG. 5 is a graph illustrating the induced voltage caused in the coil 36. FIG. 6 is a graph illustrating relationships between an aperture area, and a voltage stability and a mechanical strength. Here, the first estimation logic is described with reference to FIGS. 5 and 6.

A graph G1 of FIG. 5 illustrates temporal changes in an induced voltage Vu caused in the U-phase coil 36u, an induced voltage Vv caused in the V-phase coil 36v, and an induced voltage Vw caused in the W-phase coil 36w.

Below, the induced voltage Vu caused in the U-phase coil 36u is described as one example. In this case, the induced voltage Vu is detected by superimposing the search coil 55 on one of the four U-phase coils 36u and monitoring the voltage of the search coil 55. The following description is similar to the V-phase coil 36v and the W-phase coil 36w.

As illustrated in the lower part of FIG. 5, the magnetic flux which pierces through the S-magnet 35a among the magnetic flux which is generated by the S-magnet (first magnet) 35a is directed radially inward (see an arrow As). On the other hand, the magnetic flux which pierces through the N-magnet 35b among the magnetic flux which is generated by the N-magnet (second magnet) 35b is directed radially outward (see an arrow An). By the magnetic flux generated by the S-magnet 35a and the N-magnet 35b crossing, for example, the U-phase coil 36u, the induced voltage Vu occurs in the U-phase coil 36u.

Here, as is clear from the Faraday's law of induction, the magnitude of the induced voltage Vu is proportional to a temporal change in the magnetic flux which crosses the U-phase coil 36u. Therefore, the induced voltage Vu reaches a peak at a timing where the temporal change in the magnetic flux becomes the maximum.

In detail, the timing at which the temporal change in the magnetic flux becomes the maximum is equal to a timing at which a location of the outer circumferential part of the rotor 33 which is located at a midpoint of the S-magnet 35a and the N-magnet 35b crosses a center axis line Lc of the U-phase coil 36u (see an enclosed part C2 of FIG. 5). This timing is equivalent to a timing at which the direction of the magnetic flux which crosses the U-phase coil 36u is inverted.

On the other hand, at a timing where the temporal change in the magnetic flux becomes the minimum or becomes as small as possible, the temporal change in the induced voltage Vu can be reduced as much as possible. In detail, at a timing where the S-magnet 35a or the N-magnet 35b opposes the U-phase coil 36u, the temporal change in the induced voltage Vu becomes the minimum (see enclosed parts C1 and C3 of FIG. 5). In more detail, at a timing where the center part of the S-magnet 35a or the N-magnet 35b in the rotation direction crosses the center axis line Lc of the U-phase coil 36u (hereinafter, also referred to as "the minimum timing"), the temporal change in the induced voltage Vu becomes the minimum.

In the example illustrated in the upper part of FIG. 5, it can be seen that the induced voltage Vu becomes substantially flat in the enclosed parts C1 and C3. In detail, in the enclosed part C1, the induced voltage Vu which is mainly caused by the magnetic flux of the N-magnet 35b becomes flat. In the enclosed part C3, the induced voltage Vu which is mainly caused by the magnetic flux of the S-magnet 35a becomes flat. Below, the part where the induced voltage Vu becomes flat is referred to as "the shoulder of the induced voltage."

Moreover, the temporal change in the shoulder of the induced voltage Vu becomes flatter by providing the apertures 38 in the rotor 33. This phenomenon occurs by the apertures 38 functioning as the flux barriers, which reduces a leakage of the magnetic flux from the end parts of the magnet 35 which opposes the U-phase coil 36u to stabilize a change in the amount of magnetic flux in the end parts, and suppresses a turning around of the magnetic flux from other magnets 35 adjacent to the magnet 35 which opposes the U-phase coil 36u.

The effects demonstrated by the apertures 38 are as illustrated in FIG. 6. A graph G2 in the upper portion of FIG. 6 illustrates a relationship between the aperture area and the voltage stability. On the other hand, a graph G3 in the lower portion of FIG. 6 illustrates a relationship between the aperture area and the voltage stability. Here, the term "aperture area" means a cross-sectional area of each aperture 38 in a cross section perpendicular to the shaft 32 (i.e., the cross section illustrated in FIG. 2B). Moreover, the term "voltage stability" means a magnitude of the temporal change in the induced voltage Vu. The voltage stability becomes lower as the temporal change in the induced voltage Vu increases. Moreover, the term "mechanical strength" means a mechanical strength of the rotor 33.

As illustrated in the graph G2 of FIG. 6, the voltage stability becomes higher as the aperture area increases. However, as illustrated in a graph G3 of this drawing, the mechanical strength becomes lower as the aperture area increases. As illustrated in FIG. 6, the voltage stability and the mechanical strength are both improved by setting the aperture area so as to fall within a given range R1. When the aperture area is set within the range R1, a dimension $D_1$ of the aperture 38 satisfies Formula (C) described above. By satisfying Formula (C), and, as a result, by satisfying Formula (A), each aperture 38 can fully exhibit the flux-barrier function.

Based on the above knowledge, the present inventors established the first estimation logic as follows.

That is, the MCU 21 according to this embodiment estimates the magnet temperature based on the induced voltage Vu detected when the magnet 35 opposes any one of the plurality of coils 36 according to the rotation of the rotor 33.

In detail, the MCU 21 detects the shoulder of the induced voltage Vu through the search coil 55. Detecting the shoulder of the induced voltage Vu is equivalent to detecting the induced voltage Vu at the timing where the temporal change becomes the minimum. The combination of detecting the shoulder of the induced voltage Vu and functioning the apertures 38 as the flux barriers can suppress the temporal change as much as possible when detecting the induced voltage Vu. Therefore, the detection accuracy of the induced voltage Vu can be improved.

The MCU 21 estimates the magnet temperature based on the induced voltage Vu detected in this way. Although it is well-known, the induced voltage Vu and a density of the magnetic flux caused by the magnet 35 are in a proportional relationship. Moreover, as illustrated in a graph G7 of FIG. 8, the magnetic flux density of the magnet 35 and the magnet temperature are in a linear relationship. Therefore, the magnet temperature can be calculated through the magnetic flux density by detecting the induced voltage Vu.

Particularly, in the embodiment, the memory 212 of the MCU 21 stores a table indicative of a relation between the magnetic flux density and the magnet temperature. Therefore, the MCU 21 can estimate the magnet temperature by calculating the magnetic flux density based on the induced voltage Vu, and using the calculated magnetic flux density and the table stored in the memory 212. By estimating the magnet temperature in the state where the detection accuracy of the induced voltage Vu is improved, the magnet temperature can be estimated with sufficient accuracy.

Moreover, upon the rotation of the rotor 33, the memory 212 of the MCU 21 stores a timing (minimum timing) at which the center part of the magnet 35 in the rotation direction crosses the center axis line Lc of each of the plurality of coils 36, and the MCU 21 acquires the induced voltage Vu at the minimum timing. The minimum timing is equivalent to a timing at which the temporal change in the induced voltage Vu becomes minimum. Therefore, the detection of the induced voltage Vu at the minimum timing is effective to improve the detection accuracy. Moreover, by storing the minimum timing in advance, it is possible to more securely suppress the temporal change in the induced voltage Vu, and, as a result, it is advantageous for estimating the magnet temperature with sufficient accuracy.

Moreover, the detection of the induced voltage Vu by the MCU 21 is not performed only at the minimum timing, but it may also be performed over a given period Ts including the minimum timing.

In detail, the MCU 21 acquires the induced voltage Vu over the given period Ts including the minimum timing to estimate the magnet temperature based on an average value of the induced voltages Vu acquired over the given period Ts. By using the average value instead of the induced voltage Vu detected at the specific timing, it can suppress the effect of the temporal change in the induced voltage Vu as much as possible, and can reduce the effect of the variation in the induced voltage Vu resulting from noise, etc. This becomes advantageous when estimating the magnet temperature with sufficient accuracy.

Note that the given period Ts according to this embodiment is set so as not to include the timing at which the induced voltage Vu reaches the peak. That is, the given period Ts is set as a period which does not include the timing at which the part located at the midpoint of the two adjacent magnets 35 in the rotation direction crosses the center axis line Lc of the coil 36.

Moreover, the MCU 21 estimates the magnet temperature, not based on the induced voltage caused in the coils 36 used for driving the motor 3, but based on the induced voltage Vu caused in the search coil 55 which is superimposed with one of these coils 36. By using the search coil 55, it is possible to indirectly detect the induced voltage caused in the coil 36 on which the search coil 55 is superimposed. Thus, the temperature of each magnet 35 which passes through the search coil 55 can be estimated individually, and, as a result, the magnet temperature can be determined more accurately. As will be described later, the accurate determination of the magnet temperature becomes particularly effective when performing the motor control based on the magnet temperature.

Note that as a method of obtaining the magnet temperature based on the induced voltage Vu, an effective value, an average value, and a maximum value of the induced voltage Vu may be used, or like the second estimation logic, the lowest order higher harmonic wave when the induced voltage Vu is divided into a frequency component may be used. However, when these methods are used, the temperature of the entire magnet 35 and a temperature difference between the magnets 35 can be estimated with sufficient accuracy, but they are not suitable for individually estimating the temperature of each magnet 35.

On the other hand, according to the first estimation logic, it is possible to detect the induced voltage for every magnet 35 to individually estimate the magnet temperature. Thus, the first estimation logic is effective in that it can individually estimate the temperature of each magnet 35 with sufficient accuracy.

Moreover, as illustrated in FIG. 2B, each aperture 38 is reduced in the dimension in the radial direction of the rotor 33 as it separates from the magnet 35 in the rotation direction. In this case, since a part of the aperture 38 close to the magnet 35 is secured widely in the cross-sectional area because the dimension in the radial direction is relatively larger, it is advantageous when demonstrating the flux-barrier function. On the other hand, since a part of the aperture 38 away from the magnet is shortened gradually in the radial dimension to be tapered, it is advantageous when securing the mechanical strength of the rotor 33.

Moreover, as illustrated in FIG. 2B, among the pair of support surfaces 37a and 37b, the support surface 37a which is located radially outward is connected flush with the inner circumferential surfaces of the apertures 38. By connecting the support surface 37a flush with the inner circumferential surfaces of the apertures 38, it is possible to connect both surfaces smoothly. With this configuration, it is possible to vary the induced voltage Vu smoothly, as compared with the configuration in which a stepped part exists between the support surface 37a and the inner circumferential surfaces of the apertures 38. Therefore, the temporal change in the induced voltage Vu is suppressed more securely, and, as a result, it is advantageous when estimating the magnet temperature with sufficient accuracy.

(2-2) Second Estimation Logic

Figure 7:
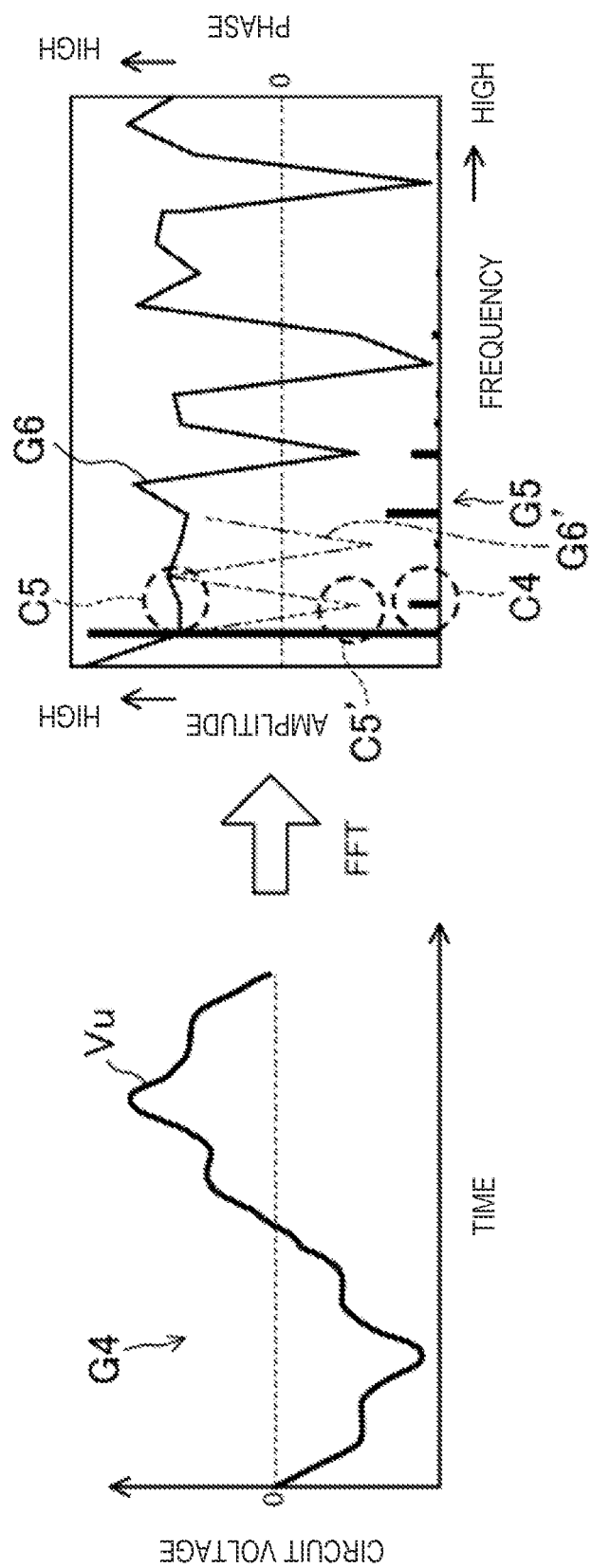
FIG. 7 is a view illustrating an amplitude and a phase which are obtained by a Fast Fourier Transform of the induced voltage.
Figure 8:
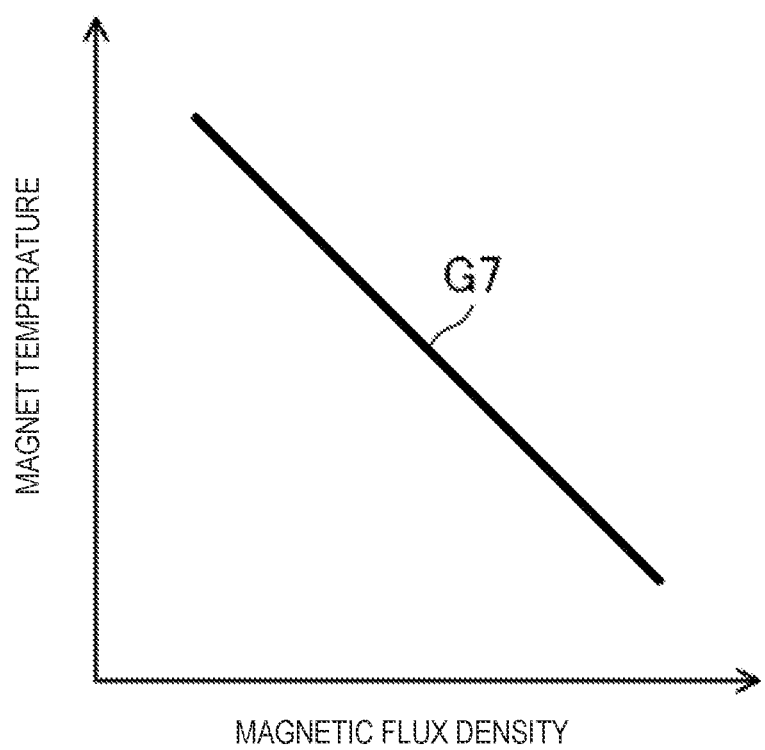
FIG. 8 is a graph illustrating a relationship between a magnetic flux density and a magnet temperature of magnets.

FIG. 7 is a view illustrating an amplitude and a phase which are obtained by Fast Fourier Transform of the induced voltage. FIG. 8 is a graph illustrating a relationship between the magnetic flux density and the magnet temperature of the magnet 35. Here, second estimation logic is described with reference to FIGS. 7 and 8.

Below, the induced voltage Vu caused in the U-phase coil 36u is described as one example. In this case, the induced voltage Vu is detected by monitoring an electric potential difference between the neutral point of the motor 3 and the connecting cable 36a connected to the U-phase coil 36u. The following description can similarly be applied to the V-phase coil 36v and the W-phase coil 36w.

A graph G4 in the left portion of FIG. 7 illustrates the induced voltage Vu caused in the U-phase coil 36u. On the other hand, a bar graph G5 in the right portion of FIG. 7 illustrates an absolute value (amplitude) of the frequency spectrum obtained by carrying out a Fast Fourier Transform (FFT) of the induced voltage Vu. Moreover, a line graph G6 in the right portion of FIG. 7 illustrates an angle of deviation (phase) of the frequency spectrum obtained by the FFT.

Moreover, a line graph G6' illustrated in the right portion of FIG. 7 is the same in the temperature difference between the S-magnet 35a and the N-magnet 35b as the graph G6, and illustrates a case where a magnitude relationship of the temperature is inverted between the S-magnet 35a and the N-magnet 35b from a case of the graph G6.

As illustrated in the graph G4, a waveform of the induced voltage Vu is different from a sine wave. This originates in a spatial relationship between the magnet 35 and the coil 36 varying according to the rotation of the rotor 33, as referred when describing the first estimation logic. From other perspective, the waveform illustrated in the graph G4 may be obtained by superimposing on a sine wave (fundamental wave) having a given frequency, a frequency component (higher harmonic wave) of an integral multiple of the given frequency.

Here, when a frequency of the fundamental wave is f0, a frequency of the lowest order higher harmonic wave is f1, the number of poles of the motor 3 is Np, a motor rotational speed is Rm, and the number of magnets 35 per pole (the number of magnets 35 per pole pair) is Nm, the following relation is satisfied.

$$f0 = Np \times Rm \quad (D)$$

$$f1 = Nm \times f0 \quad (E)$$

In this embodiment, Np=8 and Nm=2. Therefore, the lowest order higher harmonic wave becomes a secondary higher harmonic wave having a doubled frequency of the fundamental wave. Note that if split magnets are used instead of the magnet 35, Nm may be an integer of four or more.

As a result of the present inventors' diligent analyses, they discovered that, among the frequency spectra obtained by applying the FFT to the induced voltage Vu, the frequency spectrum of the lowest order higher harmonic wave contains information indirectly indicating the temperature difference between the S-magnet 35a as the first magnet 35a and the N-magnet 35b as the second magnet 35b.

According to the knowledge acquired by the present inventors, the amplitude of the frequency spectrum of the lowest order higher harmonic wave is proportional to the temperature difference between the S-magnet 35a and the N-magnet 35b. For example, the amplitude according to the higher harmonic wave becomes larger as the temperature difference increases. In the example illustrated in FIG. 7, the amplitude illustrated in an enclosed part C4 becomes larger as the temperature difference between the S-magnet 35a and the N-magnet 35b increases.

Moreover, according to the present inventors, the phase of the frequency spectrum of the higher harmonic wave is inverted in the phase between a case where the N-magnet 35b is higher in the temperature than the S-magnet 35a and a case where the S-magnet 35a is higher in the temperature than the N-magnet 35b. The example in FIG. 7 illustrates the case where the S-magnet 35a is higher in the temperature than the N-magnet 35b. In this case, the sign of the phase of the higher harmonic wave becomes positive, as illustrated in an enclosed part C5. On the other hand, even if the temperature difference between the magnets 35 is the same as the example illustrated in FIG. 7, the sign of the phase at the same frequency as the enclosed part C5 is inverted and becomes negative when the N-magnet 35b is higher in the temperature than the S-magnet 35a, as illustrated in an enclosed part C5'.

Moreover, according to the present inventors, the amplitude of the frequency spectrum of the fundamental wave is relevant to the average temperature of the S-magnet 35a and the N-magnet 35b. In detail, the amplitude according to the fundamental wave becomes larger as the average value of the magnetic flux density of the S-magnet 35a and the N-magnet 35b increases. On the other hand, the magnetic flux density is in a linear relationship with the magnet temperature, as described above. Therefore, the possible average temperature of each magnet 35 can be estimated by using the amplitude according to the fundamental wave.

Based on the above knowledge, the present inventors established the second estimation logic as follows.

That is, the MCU 21 according to this embodiment estimates the magnet temperature based on the frequency spectrum corresponding to the given frequency among the frequency components which constitute the induced voltage.

In detail, the MCU 21 performs the FFT to the induced voltage in order to acquire the frequency spectrum corresponding to the given frequency. Here, the given frequency is a frequency of the lowest order higher harmonic wave (in this embodiment, the secondary higher harmonic wave) among the n-th order higher harmonic wave (n is an integer) which is defined according to the number of magnets 35.

Next, the MCU 21 estimates the magnetic flux density of the magnet 35 based on the amplitude of the frequency spectrum obtained by the FFT. In detail, the MCU 21 adds the amplitude according to the lowest order higher harmonic wave to the amplitude according to the fundamental wave. Therefore, the maximum value of the amplitude (maximum amplitude) in consideration of the temperature difference between the magnets 35 can be calculated. In order to perform this calculation, the MCU 21 according to this embodiment is provided with a band-pass filter 57 into which the frequency spectrum obtained by the FFT is inputted. The configuration of the band-pass filter 57 may be changed suitably according to the frequency of the lowest order higher harmonic wave.

Then, the MCU 21 calculates the magnetic flux density based on the maximum amplitude obtained in this way to estimate the magnet temperature based on the magnetic flux density. The maximum amplitude indicates the maximum value of the induced voltage Vu in consideration of the temperature difference between the magnets 35. On the other hand, the induced voltage Vu and the magnetic flux density of the magnet 35 are in a proportional relationship as described above. Moreover, the magnetic flux density of the magnet 35 and the magnet temperature are in a linear relationship. Therefore, the magnet temperature can be calculated through the magnetic flux density by detecting the induced voltage Vu.

The MCU 21 can also identify a relatively hot or cold magnet 35 among the N-magnet 35b and the S-magnet 35a based on the phase of the frequency spectrum obtained by the FFT. This function is used for the motor control based on the magnet temperature (described later).

Thus, according to the second estimation logic, the magnet temperature can be estimated with sufficient accuracy by using the amplitude of the frequency spectrum obtained by performing the Fourier transform to the induced voltage Vu.

Meanwhile, as a method of obtaining the magnet temperature based on the induced voltage Vu, the magnet temperature may be estimated based on the induced voltage Vu detected at the specific timing, like the first estimation logic. However, in order to use this method, a sampling frequency when carrying out an analog/digital (A/D) conversion of the induced voltage needs to be set as high as it suits the rotational speed of the motor 3. Such a method is inconvenient when the motor rotates at high speed.

On the other hand, since the second estimation logic can estimate the magnet temperature without detecting the induced voltage Vu at the specific timing, the sampling frequency can be kept lower than the conventional method. It is possible to simplify the processing to the induced voltage Vu, such as filtering processing, by keeping the sampling frequency low. Moreover, the simplification of the processing to the induced voltage Vu is effective when estimating the magnet temperature more promptly or more securely.

Moreover, according to the second estimation logic, the relatively hot magnet 35 can be identified among the S-magnet 35a and the N-magnet 35b by using the phase of the frequency spectrum. This is effective when finely controlling the temperature of each magnet 35.

Particularly, by using the amplitude and the phase of the lowest order higher harmonic wave, the temperature difference of the magnets 35 can be estimated with sufficient accuracy, and the hotter magnet 35 can be identified with sufficient accuracy. This is effective when estimating the temperature of each magnet 35 more exactly.

Moreover, as described above, by estimating the magnet temperature based on the maximum amplitude which can be obtained by adding the amplitude of the lowest order higher harmonic wave to the amplitude of the fundamental wave, the temperature estimation in consideration of the possible temperature variation of each magnet 35 can be achieved. Therefore, without underestimating the magnet temperature, the magnet temperature can be estimated on the safer side.

(3) Device for Estimating Magnet Temperature

FIG. 4 is a block diagram illustrating a configuration of the motor magnet temperature estimating device.

The estimating device illustrated in FIG. 4 is provided with a plurality of functional blocks. In detail, the estimating device includes an estimating method selecting module 214 which selects either one of the first estimation logic and the second estimation logic, a first estimating module 215 which performs the first estimation logic, a second estimating module 216 which performs the second estimation logic, and a motor controlling module 217 which controls the motor 3 based on the executed result of the first estimating module 215 or the second estimating module 216.

Below, the functional blocks are described in order.

(3-1) Estimating Method Selecting Module

The estimating method selecting module 214 selects whether the first estimation logic is to be performed by the first estimating module 215 or the second estimation logic is to be performed by the second estimating module 216 based on the rotational speed of the rotor 33.

In detail, the estimating method selecting module 214 selects, based on the detection signal from the motor rotational speed sensor 41, the first estimating module 215 if the rotational speed of the rotor 33 is below a given threshold, and the second estimating module 216 if the rotational speed of the rotor 33 is the given threshold or above. The estimating method selecting module 214 causes the selected one of the first estimating module 215 and the second estimating module 216 to perform the temperature estimation.

In the estimation of the magnet temperature by the first estimating module 215, the magnet temperature can be individually estimated with sufficient accuracy. On the other hand, since the estimation of the magnet temperature by the second estimating module 216 can keep the sampling frequency lower than the conventional method, it can securely estimate the magnet temperature, even if the rotational speed of the motor 3 is high.

Then, if the rotational speed of the motor 3 is relatively low, the estimating method selecting module illustrated in FIG. 4 causes the first estimating module 215 to perform the temperature estimation, and, on the other hand, if the rotational speed of the motor 3 is high, it causes the second estimating module 216 to perform the temperature estimation. By configuring in this way, the magnet temperature can be securely estimated, while the estimation accuracy of the magnet temperature is secured as much as possible, even if the rotational speed of the motor 3 is high.

Note that the given threshold used as a reference of the choice by the estimating method selecting module 214 is defined according to the specification of the motor 3. This given threshold is stored in the memory 212 of the MCU 21 in advance.

(3-2) First Estimating Module

The first estimating module 215 includes, as functional blocks for performing the first estimation logic, an induced voltage detecting module 21a, an average voltage calculating module 21b, a flux-density calculating module 21c, a magnet temperature estimating module 21d, and a regulating amount calculating module 21e.

Among these, the induced voltage detecting module 21a detects the induced voltage Vu through the search coil 55. This induced voltage Vu is in substantially agreement with the induced voltage caused in the U-phase coil 36u on which the search coil 55 is superimposed among the total of twelve coils 36. In detail, the induced voltage detecting module 21a detects the induced voltage Vu through an A/D converter (not illustrated) and converts it into a digital signal. The induced voltage Vu converted into the digital signal by the induced voltage detecting module 21a is inputted into the average voltage calculating module 21b.

The average voltage calculating module 21b calculates an average voltage in the shoulder described above (in detail, the given period Ts including the minimum timing) based on the induced voltage Vu inputted from the induced voltage detecting module 21a. The calculation of the average voltage is individually performed to both of the shoulder which originates in the N-magnet 35b (see the enclosed part C1 of FIG. 5) and the shoulder which originates in the S-magnet 35a (see the enclosed part C3 of FIG. 5). Moreover, a range of electrical angle equivalent to the given period Ts is stored in the memory 212 in advance. The average voltage calculating module 21b calculates the average value of the induced voltage Vu in the given period Ts based on the range of the electrical angle stored in the memory 212 and the detection signal from the motor rotation sensor 51. The calculated average value is inputted into the flux-density calculating module 21c.

Below, among the average values calculated by the average voltage calculating module 21b, the average value according to the N-magnet 35b is referred to as a "first voltage Vn" and the average value according to the S-magnet 35a is referred to as a "second voltage Vp."

The flux-density calculating module 21c calculates a magnetic flux density Bn of the N-magnet 35b and a magnetic flux density Bp of the S-magnet 35a based on the first voltage Vn and the second voltage Vp which are inputted from the average voltage calculating module 21b. In detail, the flux-density calculating module 21c calculates the magnetic flux densities Bn and Bp based on the following Formulas (F) and (G).

$$Bn=Vn/(Rm \times Nc \times c) \quad (F)$$

$$Bp=Vs/(Rm \times Nc \times c) \quad (G)$$

In Formulas (F) and (G), Rm is a motor rotational speed, Nc is the number of turns of the coil, and c is a constant. The motor rotational speed Rm is detected each time by the motor rotation sensor 51. The number of coil turns Nc and the constant c are stored in the memory 212 in advance, and are read when calculating the magnetic flux densities Bn and Bp. The magnetic flux densities Bn and Bp estimated by the flux-density calculating module 21c are inputted into the magnet temperature estimating module 21d.

The magnet temperature estimating module 21d estimates a magnet temperature Tp of the S-magnet 35a and a magnet temperature Tn of the N-magnet 35b based on the magnetic flux densities Bn and Bp estimated by the flux-density calculating module 21c. In detail, the magnet temperature estimating module 21d reads a table corresponding to the graph G7 of FIG. 8 from the memory 212 to estimate the magnet temperatures Tp and Tn by comparing the magnetic flux densities Bn and Bp with the table. The magnet temperatures Tn and Tp estimated by the magnet temperature estimating module 21d are inputted into the regulating amount calculating module 21e.

The regulating amount calculating module 21e determines a temperature state of each of the magnets 35a and 35b based on the magnet temperatures Tn and Tp estimated by the magnet temperature estimating module 21d. If the temperature state is determined to be abnormal, the regulating amount calculating module 21e calculates a motor regulating amount Pm for regulating the output of the motor 3.

In detail, the regulating amount calculating module 21e compares each of the magnet temperatures Tn and Tp with an upper limit temperature Tmax set in advance. If the magnet temperature Tn according to the N-magnet 35b and the magnet temperature Tp according to the S-magnet 35a both exceed the upper limit temperature Tmax, the regulating amount calculating module 21e determines that the temperature state of the magnet 35 is abnormal. Here, the upper limit temperature Tmax is defined according to the specification and the design of the motor 3, and is stored in the memory 212 in advance. If the temperature state of the magnet 35 is determined to be abnormal, the regulating amount calculating module 21e calculates the power regulating amount by the following Formula (H).

$$\text{Power Regulating Amount}=K1|Tn-T\text{max}|+K1|Tp-T\text{max}| \quad (H)$$

In Formula (H), the constant K is stored in the memory 212 in advance, and is read when calculating the power regulating amount. The power regulating amount calculated by the regulating amount calculating module 21e is inputted into the motor controlling module 217.

Note that when at least one of the magnet temperatures Tn and Tp reaches the upper limit temperature Tmax or below, the regulating amount calculating module 21e determines that the temperature state of the magnet 35 is normal. In this case, the calculation of the power regulating amount is not performed.

(3-3) Second Estimating Module

The second estimating module 216 includes, as functional blocks for performing the second estimation logic, an induced voltage detecting module 21f, an FFT executing module 21g, a temperature variation calculating module 21h, a flux-density calculating module 21i, a magnet temperature estimating module 21j, and a regulating amount calculating module 21k.

Among these, the induced voltage detecting module 21f detects the induced voltage Vu through the voltage sensor 56. This induced voltage Vu is substantially in agreement with the induced voltage caused in the four U-phase coils 36u among the total of twelve coils 36. In detail, the induced voltage detecting module 21a detects the induced voltage Vu through the A/D converter (not illustrated) and converts it into a digital signal. The induced voltage Vu converted into the digital signal by the induced voltage detecting module 21f is inputted into the average voltage calculating module 21b.

The FFT executing module 21g performs an FFT to the induced voltage Vu inputted from the induced voltage detecting module 21f, and converts the induced voltage Vu into a frequency spectrum. In detail, the FFT executing module 21g performs the FFT to data over N periods among the induced voltage Vu. Note that the term "N periods" as used herein refers to a range where the motor rotational speed does not change much. The value of N may be stored in the memory 212 in advance, or may be calculated each time based on the detection signal from the motor rotation sensor 51.

The FFT executing module 21g applies the FFT to the induced voltage Vu to obtain a frequency spectrum which is transformed in variables from the actual time to the frequency. In more detail, the frequency spectrum obtained by the FFT executing module 21g is comprised of an absolute value (amplitude) of the frequency spectrum, and an angle of deviation (phase) of the frequency spectrum.

Then, the FFT executing module 21g filters the obtained frequency spectrum by using the band-pass filter 57. Through the filtering, the FFT executing module 21g derives at least an amplitude Fa of the fundamental wave, and an amplitude Fb and the phase Pb of the lowest order higher harmonic wave, and then inputs them into the temperature variation calculating module 21h.

The temperature variation calculating module 21h calculates the maximum value (maximum amplitude) Fmax of the amplitude resulting from the temperature variation, based on the input signal from the FFT executing module 21g. In detail, the temperature variation calculating module 21h calculates the maximum amplitude Fmax based on the following Formula (I).

$$F\text{max}=Fa+Fb \quad (I)$$

As illustrated in the above Formula (I), the temperature variation calculating module 21h calculates the maximum amplitude Fmax by adding the amplitude Fb of the lowest order higher harmonic wave to the amplitude Fa of the fundamental wave. The maximum amplitude Fmax calculated by the temperature variation calculating module $21h$ is inputted into the flux-density calculating module $21i$.

The flux-density calculating module $21i$ calculates a magnetic flux density Bm of each magnet 35 based on the maximum amplitude Fmax calculated by the temperature variation calculating module $21h$. In detail, the flux-density calculating module $21i$ calculates the magnetic flux density Bm based on the following Formula (J).

$$Bm=Vn/(Rm \times Nc \times c) \qquad (J)$$

The arguments Rm, Nc, and c are the same as the above Formulas (J) and (G). The magnetic flux density Bm estimated by the flux-density calculating module $21i$ is inputted into the magnet temperature estimating module $21j$.

The magnet temperature estimating module $21j$ estimates the magnet temperature Tm of each magnet 35 based on the magnetic flux density Bm estimated by the flux-density calculating module $21i$. In detail, the magnet temperature estimating module $21j$ reads a table corresponding to the graph G7 of FIG. 8 from the memory 212 to estimate the magnet temperature Tm by comparing the magnetic flux density Bm with the table. The magnet temperature Tm estimated by the magnet temperature estimating module $21j$ is inputted into the regulating amount calculating module $21k$.

The regulating amount calculating module $21k$ determines a temperature state of each magnet 35 based on the magnet temperature Tm estimated by the magnet temperature estimating module $21j$. The regulating amount calculating module $21k$ calculates a motor regulating amount Pm for regulating the output of the motor 3 when the temperature state is determined to be abnormal.

In detail, the regulating amount calculating module $21k$ compares the magnet temperature Tm with the upper limit temperature Tmax set in advance. If the magnet temperature Tm exceeds the upper limit temperature Tmax, the regulating amount calculating module $21k$ determines that the temperature state of the magnet 35 is abnormal. Here, the upper limit temperature Tmax is stored in the memory 212 in advance, similar to the regulating amount calculating module $21e$ in the first estimating module 215. If the temperature state of the magnet 35 is determined to be abnormal, the regulating amount calculating module $21k$ calculates the power regulating amount by the following Formula (K).

$$\text{Power Regulating Amount}=K2|Tm-Tmax| \qquad (K)$$

In Formula (K), the constant K2 is stored in the memory 212 in advance, and is read when calculating the power regulating amount. The power regulating amount calculated by the regulating amount calculating module $21k$ is inputted into the motor controlling module 217.

Note that when the magnet temperature Tm reaches the upper limit temperature Tmax or below, the regulating amount calculating module $21k$ determines that the temperature state of the magnet 35 is normal. In this case, the calculation of the power regulating amount is not performed.

(3-4) Motor Controlling Module

The motor controlling module 217 performs a control based on the power regulating amount calculated by the first estimating module 215 or the second estimating module 216. In detail, the motor controlling module 217 compares the power regulating amount with the demanded output of the motor 3, and determines whether the demanded output exceeds the power regulating amount.

Here, if the demanded output exceeds the power regulating amount, the motor controlling module 217 drives the motor 3 through the inverter 6, while performing a high-temperature measure control for addressing the temperature abnormality of the magnet 35. On the other hand, if the demanded output is below the power regulating amount, the motor controlling module 217 determines that the countermeasure to the temperature abnormality of the magnet 35 is not necessary, and drives the motor 3 through the inverter 6, as usual.

Note that the motor controlling module 217 regulates the output of the motor 3 by regulating the acceleration of the automobile 1 or regulating a charged amount of the battery 10, as the high-temperature measure control. Instead of regulating the output of the motor 3, the motor controlling module 217 may increase an amount of cooling of the motor 3 by increasing a flow rate of coolant or performing forcible air cooling. Alternatively, the motor controlling module 217 may suppress a generation of the Joule's heat resulting from eddy current by modulating the alternating current supplied to the coils 36.

(4) Example of Motor Control

Figure 9:
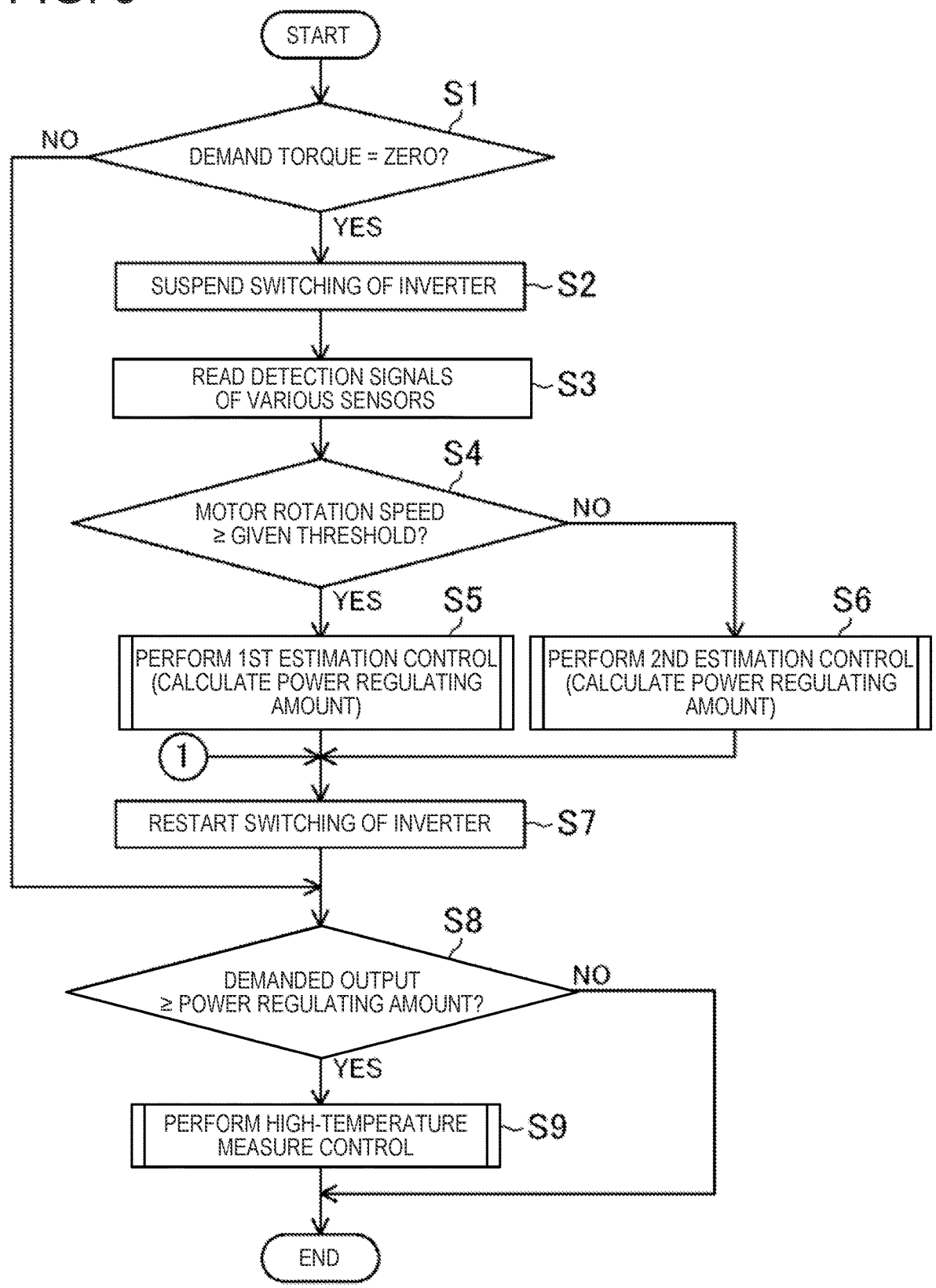
FIG. 9 is a flowchart illustrating processing relevant to first and second estimation controls.
Figure 10:
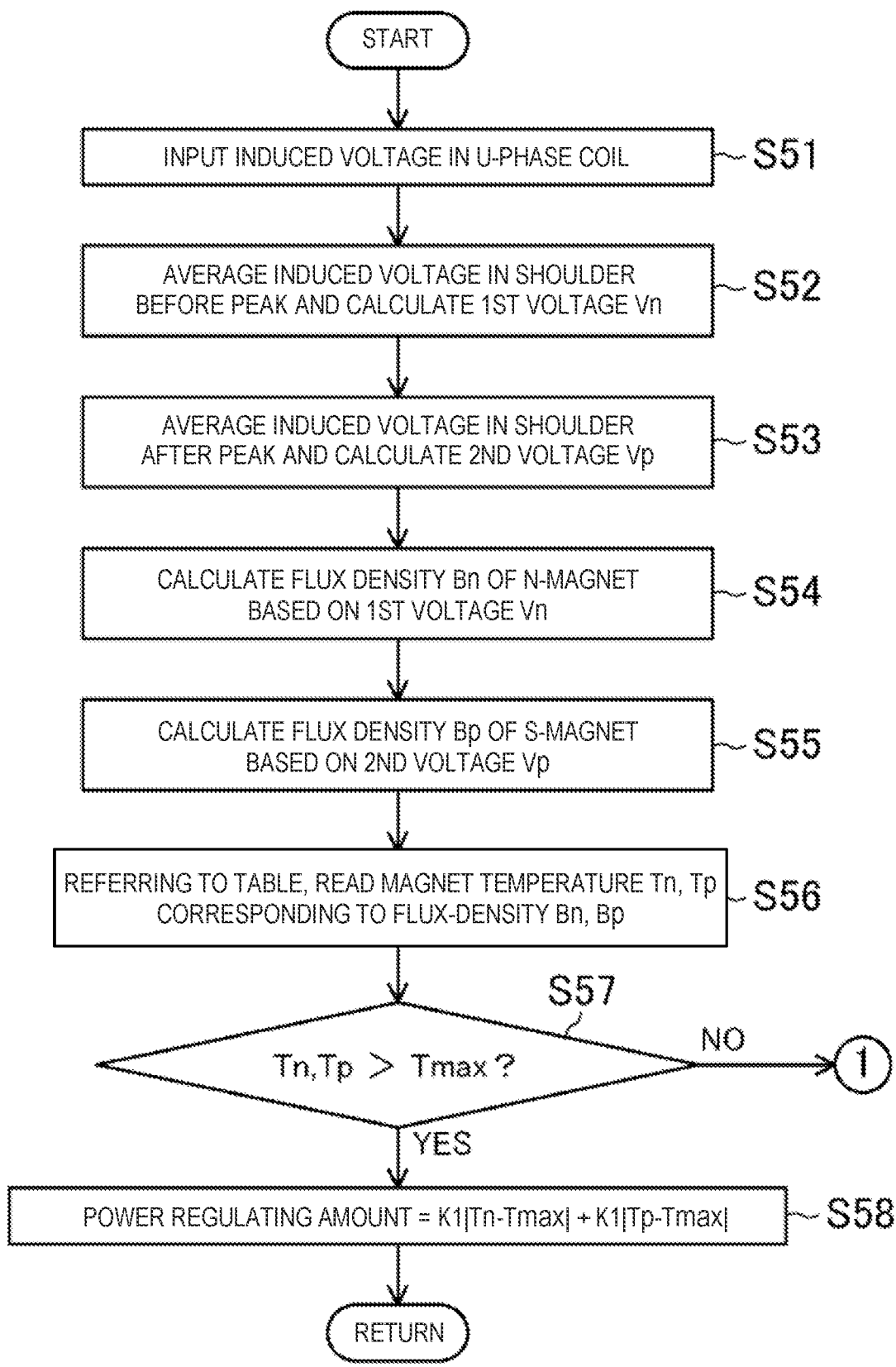
FIG. 10 is a flowchart illustrating an estimation procedure of the magnet temperature by a first estimating module.
Figure 11:
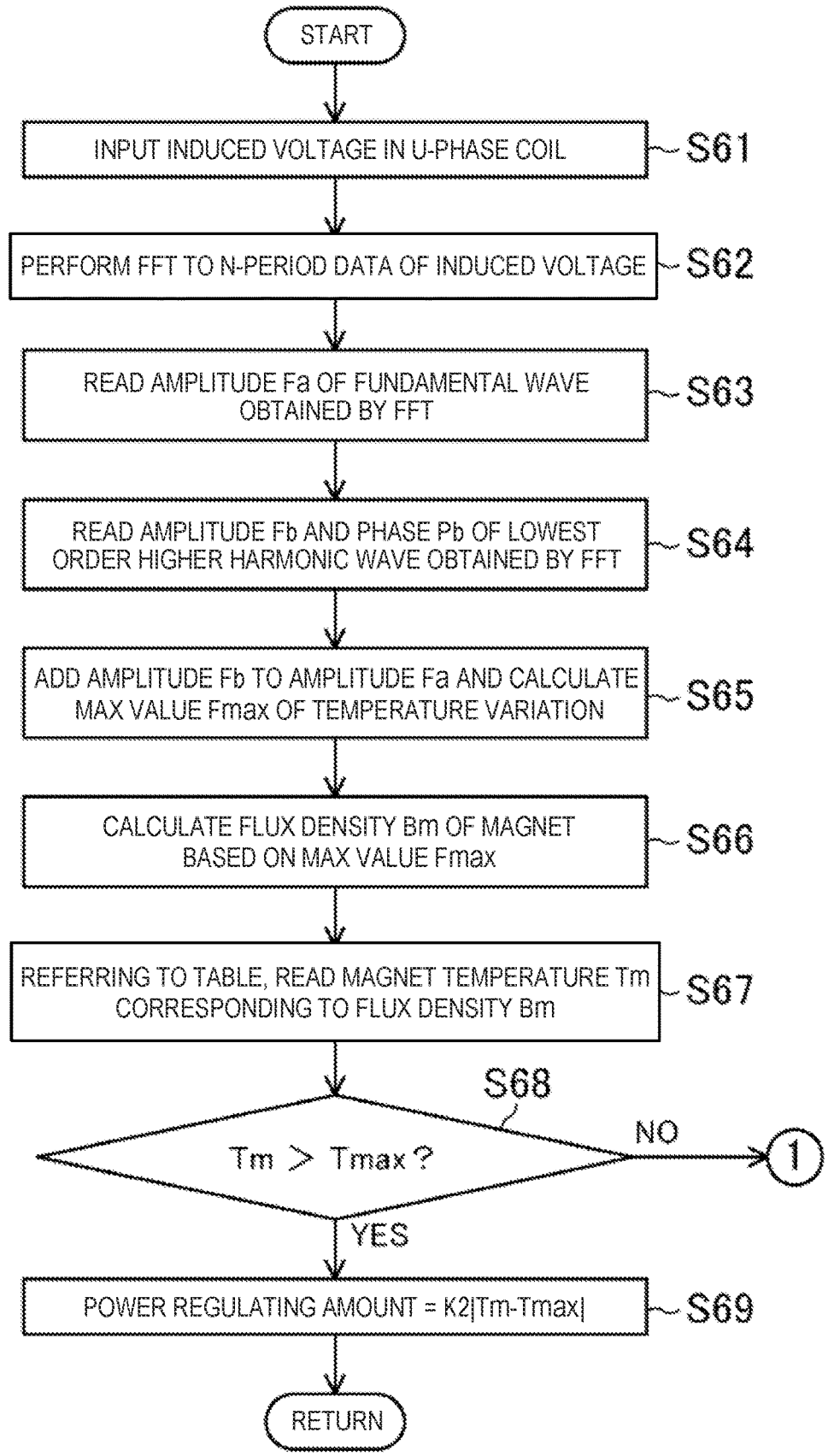
FIG. 11 is a flowchart illustrating an estimation procedure of the magnet temperature by a second estimating module.

Below, a concrete example of the motor control executed by the MCU 21 is described. FIG. 9 is a flowchart illustrating processing relevant to the first and second estimation controls. Moreover, FIG. 10 is a flowchart illustrating the estimation procedure of the magnet temperature by the first estimating module 215, and FIG. 11 is a flowchart illustrating the estimation procedure of the magnet temperature by the second estimating module 216.

First, at Step S1 of FIG. 9, the MCU 21 determines whether the demand torque of the motor 3 is zero. This determination is performed based on the detection signal from the various sensors, such as the accelerator sensor 54. The situation where the demand torque of the motor 3 is zero corresponds to a state where an acceleration or a deceleration of the automobile 1 is not demanded, a state where the power generation of the motor 3 is not demanded, etc. If the determination at Step S1 is NO, the control process shifts to Step S8. On the other hand, if the determination at Step S1 is YES, the control process shifts to Step S2.

At Step S2, the MCU 21 suspends switching of the inverter 6. In detail, the MCU 21 suspends an on-off control of a switching element inside the inverter 6.

Then, at Step S3, the MCU 21 reads the detection signals from the various sensors. The detection signal read at Step S3 includes at least the detection signal from the motor rotation sensor 51.

Then, at Step S4, the estimating method selecting module 214 in the MCU 21 determines whether the rotational speed of the motor 3 is at or above the given threshold. If above the given threshold, the estimating method selecting module 214 shifts to Step S5, and, on the other hand, if below the given threshold, it shifts to Step S6.

At Step S5, the first estimating module 215 performs the control based on the first estimation logic (first estimation control) to estimate the magnet temperature. On the other hand, at Step S6, the second estimating module 216 performs the control based on the second estimation logic (second estimation control) to estimate the magnet temperature.

FIG. 10 is a flowchart illustrating the detail of Step S5 in FIG. 9. That is, Steps S51 to S58 of FIG. 10 constitute Step S5 of FIG. 9.

First, at Step S51, the induced voltage Vu caused in the U-phase coil $36u$ is inputted into the induced voltage detecting module $21a$. The induced voltage Vu inputted into the induced voltage detecting module 21a is equivalent to the induced voltage Vu detected by the search coil 55.

Then, at Step S52, the average voltage calculating module 21b averages the voltage value in the shoulder of the induced voltage Vu before the peak (i.e., the shoulder which originates in the N-magnet 35b), and sets it as a first voltage Vn. The shoulder here is equivalent to the given period Ts described above. This given period Ts may be, for example, the electrical angle of 40° or more and 50° or less.

Then, at Step S53, the average voltage calculating module 21b averages the voltage value in the shoulder of the induced voltage Vu after the peak (i.e., the shoulder which originates in the S-magnet 35a), and sets it as a second voltage Vp. The given period Ts equivalent to the shoulder after the peak may be, for example, the electrical angle of 130° or more and 140° or less.

Then, at Step S54, the flux-density calculating module 21c calculates the magnetic flux density Bn of the N-magnet 35b based on the first voltage Vn. The calculation of the magnetic flux density Bn is performed based on Formula (F) described above.

Then, at Step S55, the flux-density calculating module 21c calculates the magnetic flux density Bp of the S-magnet 35a based on the second voltage Vp. The calculation of the magnetic flux density Bp is performed based on Formula (G) described above.

Then, at Step S56, the magnet temperature estimating module 21d compares the magnetic flux densities Bn and Bp of the N-magnet 35b and the S-magnet 35a with the table stored in the memory 212, and reads the magnet temperature Tn corresponding to the magnetic flux density Bn of the N-magnet 35b and the magnet temperature Tp corresponding to the magnetic flux density Bp of the S-magnet 35a.

Then, at Step S57, the regulating amount calculating module 21e compares the magnet temperature Tn of the N-magnet 35b with the upper limit temperature Tmax, and compares the magnet temperature Tp of the S-magnet 35a with the upper limit temperature Tmax. Then, if the two magnet temperatures Tn and Tp are both higher than the upper limit temperature Tmax, the regulating amount calculating module 21e shifts to Step S58. On the other hand, if one of the two magnet temperature Tn and Tp is at or below the upper limit temperature Tmax, the regulating amount calculating module 21e skips Step S58 and returns to Step S7.

On the other hand, at Step S58, the regulating amount calculating module 21e calculates the power regulating amount by using Formula (H) described above, and returns to Step S7. That is, the control process returns from the flow illustrated in FIG. 10 and shifts to Step S7 of FIG. 9.

On the other hand, FIG. 11 is a flowchart illustrating the detail of Step S6 in FIG. 9. That is, Steps S61 to S69 of FIG. 11 constitute Step S6 of FIG. 9.

First, at Step S61, the induced voltage Vu caused in the U-phase coil 36u is inputted into the induced voltage detecting module 21f. The induced voltage Vu inputted into the induced voltage detecting module 21a is equivalent to the induced voltage Vu detected by the voltage sensor 56.

Then, at Step S62, the FFT executing module 21g performs the FFT to the N-period data of the induced voltage Vu. As described above, the N periods refers to the period during which the motor rotational speed does not change much. The FFT executing module 21g filters the frequency spectrum obtained by the FFT with the band-pass filter 57 to output the amplitude Fa of the fundamental wave, and the amplitude Fb and the phase Pb of the lowest order higher harmonic wave.

Then, at Step S63, the temperature variation calculating module 21h reads the amplitude Fa of the fundamental wave which is obtained by the FFT. Then, at Step S64, the temperature variation calculating module 21h reads the amplitude Fb and the phase Pb of the lowest order higher harmonic wave which are obtained by the FFT.

Then, at Step S65, the temperature variation calculating module 21h calculates the maximum amplitude Fmax corresponding to the maximum value of the temperature variation by adding the amplitude Fb of the lowest order higher harmonic wave to the amplitude Fa of the fundamental wave.

Then, at Step S66, the flux-density calculating module 21i calculates the magnetic flux density Bm of the magnet 35 based on the maximum amplitude Fmax. The calculation of the magnetic flux density Bm is performed based on Formula (J) described above.

Then, at Step S67, the magnet temperature estimating module 21j compares the magnetic flux density Bm of the magnet 35 with the table stored in the memory 212, and reads the magnet temperature Tm corresponding to the magnetic flux density Bm.

Then, at Step S68, the regulating amount calculating module 21k compares the magnet temperature Tm with the upper limit temperature Tmax. Then, if the magnet temperature Tm is higher than the upper limit temperature Tmax, the regulating amount calculating module 21k shifts to Step S69. On the other hand, if the magnet temperature Tm is at or below the upper limit temperature Tmax, the regulating amount calculating module 21k skips Step S69, and returns to Step S7.

At Step S58, the regulating amount calculating module 21k calculates the power regulating amount based on Formula (K) described above, and returns to Step S7. That is, the control process returns from the flow illustrated in FIG. 11 and shifts to Step S7 of FIG. 9.

When having returned to the flow of FIG. 9, the MCU 21 suspends the switching of the inverter 6 at Step S7 after Steps S5 and S6. In detail, the MCU 21 starts the on-off control of the switching element inside the inverter 6.

Then, at Step S8, the motor controlling module 217 determines whether the demanded output of the motor 3 exceeds the power regulating amount. If this determination is YES, the control process shifts to Step S9, and, on the other hand, if NO, the control process skips Step S9 and ends this process.

At Step S9, the MCU 21 performs the high-temperature measure control described above. By performing the high-temperature measure control, it is possible, for example, to regulate the output of the motor 3, to increase the amount of cooling of the motor 3, and to suppress the generation of the Joule's heat resulting from the eddy current.

Other Embodiments

Although in the above embodiment the first estimating module 215 performs the first estimation logic based on the detection signal from the search coil 55, the present disclosure is not limited to this configuration. For example, the first estimating module 215 may perform the first estimation logic based on the detection signal from the voltage sensor 56.

Similarly, although in the above embodiment the second estimating module 216 performs the second estimation logic based on the detection signal from the voltage sensor 56, the present disclosure is not limited to this configuration. For example, the second estimating module 216 may perform the second estimation logic based on the detection signal from the search coil 55.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automobile
2 Engine
21 MCU (Controller)
214 Estimating Method Selecting Module
215 First Estimating Module
216 Second Estimating Module
217 Motor Controlling Module
21g FFT Executing Module
3 Motor
35 Magnet
35a S-magnet (First Magnet)
35b N-magnet (Second Magnet)
36 Coil
36u U-phase Coil
36v V-phase Coil
36w W-phase Coil
37 Accommodation Space
37a Support Surface
37b Support Surface
38 Aperture
51 Motor Rotation Sensor
55 Search Coil (Sensor)
56 Voltage Sensor (Sensor)
57 Band-pass Filter
6 Inverter
Lc Center Axis Line
Ts Given Period

What is claimed is:

1. A magnet temperature estimating device for a motor provided with a rotor having magnets and configured to output a rotational motive force, and a stator having a plurality of coils opposing the rotor with a gap therebetween, the device comprising:
a sensor configured to detect an induced voltage induced by rotation of the rotor; and
a controller configured to control the motor by supplying power to the plurality of coils in response to an input of a detection signal from the sensor,
wherein apertures adjacent to each magnet in a rotation direction of the rotor are formed in the rotor,
wherein the controller estimates a temperature of one of the magnets based on the induced voltage detected when the one magnet opposes any one of the plurality of coils, according to the rotation of the rotor, and
wherein the controller stores in advance a timing at which a center part of the one magnet in the rotation direction crosses a center axis line of each of the plurality of coils as the rotor rotates, and acquires the induced voltage at the stored timing.

2. The motor magnet temperature estimating device of claim 1, wherein the controller acquires the induced voltages over a given period including the stored timing, and estimates the temperature of the one magnet based on an average value of the induced voltages acquired over the given period.

3. The motor magnet temperature estimating device of claim 2, wherein, in a cross section perpendicular to a rotation axis of the rotor, when a dimension of each aperture in the rotation direction is $D_1$ and a diameter of the coil in the rotation direction is $D_2$, a relationship of $$D_1 \geq D_2/4$$

is satisfied.

4. The motor magnet temperature estimating device of claim 3, wherein for each aperture, the aperture extends in the rotation direction, and a dimension of the aperture in a radial direction of the rotor decreases along the rotation direction away from the adjacent magnet.

5. The motor magnet temperature estimating device of claim 4,
wherein each aperture communicates with an accommodation space configured to accommodate the adjacent magnet, the accommodation space being formed in the rotor,
wherein the accommodation space has a pair of support surfaces pinching the adjacent magnet from both sides in the radial direction, and
wherein at least one of the pair of support surfaces is connected flush with an inner circumferential surface of the aperture.

6. The motor magnet temperature estimating device of claim 5,
wherein the sensor is comprised of a search coil superimposed on one of the plurality of coils, the search coil being connected to a circuit independent of an inverter configured to drive the motor, and
wherein the controller estimates the temperature of the one magnet based on the induced voltage induced in the search coil.

7. The motor magnet temperature estimating device of claim 6,
wherein the controller determines a temperature state of the one magnet based on the estimation result of the temperature of the one magnet, and
wherein the controller regulates the output of the motor when the controller determines that the temperature state is abnormal.

8. A hybrid vehicle, comprising:
the motor magnet temperature estimating device of claim 7;
the motor; and
an engine configured to collaborate with the motor.

9. The motor magnet temperature estimating device of claim 1, wherein for each aperture, the aperture extends in the rotation direction, and a dimension of the aperture in a radial direction of the rotor decreases along the rotation direction away from the adjacent magnet.

10. The motor magnet temperature estimating device of claim 1,
wherein the sensor is comprised of a search coil superimposed on one of the plurality of coils, the search coil being connected to a circuit independent of an inverter configured to drive the motor, and
wherein the controller estimates the temperature of the one magnet based on the induced voltage induced in the search coil.

11. The motor magnet temperature estimating device of claim 1, wherein the controller determines a temperature state of the one magnet based on the estimation result of the temperature of the one magnet, and wherein the controller regulates the output of the motor when the controller determines that the temperature state is abnormal.

12. A hybrid vehicle, comprising:

the motor magnet temperature estimating device of claim 1;

the motor; and an engine configured to collaborate with the motor.

13. A magnet temperature estimating device for a motor provided with a rotor having magnets and configured to output a rotational motive force, and a stator having a plurality of coils opposing the rotor with a gap therebetween, the device comprising:

a sensor configured to detect an induced voltage induced by rotation of the rotor; and a controller configured to control the motor by supplying power to the plurality of coils in response to an input of a detection signal from the sensor, wherein apertures adjacent to each magnet in a rotation direction of the rotor are formed in the rotor, wherein the controller estimates a temperature of one of the magnets based on the induced voltage detected when the one magnet opposes any one of the plurality of coils, according to the rotation of the rotor, and wherein, in a cross section perpendicular to a rotation axis of the rotor, when a dimension of each aperture in the rotation direction is $D_1$ and a diameter of the coil in the rotation direction is $D_2$, a relationship of $$D_1 \geq D_2/4$$

is satisfied.

14. The motor magnet temperature estimating device of claim 13, wherein for each aperture, the aperture extends in the rotation direction, and a dimension of the aperture in a radial direction of the rotor decreases along the rotation direction away from the adjacent magnet.

15. The motor magnet temperature estimating device of claim 14, wherein each aperture communicates with an accommodation space configured to accommodate the magnet, the accommodation space being formed in the rotor, wherein the accommodation space has a pair of support surfaces pinching the magnet from both sides in the radial direction, and wherein at least one of the pair of support surfaces is connected flush with an inner circumferential surface of the aperture.

16. The motor magnet temperature estimating device of claim 15, wherein the sensor is comprised of a search coil superimposed on one of the plurality of coils, the search coil being connected to a circuit independent of an inverter configured to drive the motor, and wherein the controller estimates the temperature of the one magnet based on the induced voltage induced in the search coil.

17. The motor magnet temperature estimating device of claim 13, wherein the controller determines a temperature state of the one magnet based on the estimated temperature of the one magnet, and wherein the controller regulates the output of the motor when the controller determines that the temperature state is abnormal.

18. A hybrid vehicle, comprising:

the motor magnet temperature estimating device of claim 13;

the motor; and an engine configured to collaborate with the motor.

* * * * *